US011953671B2

(12) United States Patent
Shen

(10) Patent No.: US 11,953,671 B2
(45) Date of Patent: Apr. 9, 2024

(54) TELESCOPES AND OTHER OPTICAL INSTRUMENTS WITH VISUALLY ACCESSIBLE OPTICAL COMPONENTS

(71) Applicant: Dar-Tson Shen, North Vancouver (CA)

(72) Inventor: Dar-Tson Shen, North Vancouver (CA)

(73) Assignee: Dar-Tson Shen, North Vancouver (CA)

( * ) Notice: Subject to any disclaimer, the term of this patent is extended or adjusted under 35 U.S.C. 154(b) by 749 days.

(21) Appl. No.: 16/935,129

(22) Filed: Jul. 21, 2020

(65) Prior Publication Data

US 2020/0400935 A1    Dec. 24, 2020

Related U.S. Application Data

(63) Continuation of application No. PCT/CA2019/050092, filed on Jan. 25, 2019.

(60) Provisional application No. 62/752,330, filed on Oct. 29, 2018, provisional application No. 62/659,597, filed on Apr. 18, 2018, provisional application No. 62/622,815, filed on Jan. 26, 2018.

(51) Int. Cl.
*G02B 23/16* (2006.01)
*G02B 7/02* (2021.01)
*G02B 7/04* (2021.01)

(52) U.S. Cl.
CPC .............. *G02B 23/16* (2013.01); *G02B 7/021* (2013.01); *G02B 7/022* (2013.01); *G02B 7/04* (2013.01)

(58) Field of Classification Search
CPC ........ G02B 23/16; G02B 23/18; G02B 7/021; G02B 7/022; G02B 7/04; F41G 1/04; F41G 11/004; F41G 11/003
See application file for complete search history.

(56) References Cited

U.S. PATENT DOCUMENTS

| 904,066 A | 11/1908 | Heinrich |
| 3,574,954 A | 4/1971 | Schone et al. |

(Continued)

FOREIGN PATENT DOCUMENTS

| CN | 107422469 A | * | 12/2017 | ............ G02B 23/00 |
| CN | 107422469 A | | 12/2017 | |

(Continued)

OTHER PUBLICATIONS

Open Telescope by R. Kouhoupt in Popular Science (1969) vol. 195 No 2.

*Primary Examiner* — Ephrem Z Mebrahtu
(74) *Attorney, Agent, or Firm* — Todd A. Rattray, Oyen Wiggs Green & Mutala LLP

(57) ABSTRACT

An optical instrument comprises: an openable housing and a cover portion which together define an optical path cavity through which light travels for operation of the optical instrument; and one or more optical components mounted to the openable cover portion and located within or at least partially within the optical path cavity. The openable housing defines a housing aperture. The cover portion is moveable relative to the openable housing between: a closed position where the cover portion is located to cover the housing aperture to visually conceal the one or more optical components or at least portions of the one or more optical components; and an open position where the cover portion is located to uncover the housing aperture and visually expose the one or more optical elements or at least portions of the one or more optical components via the housing aperture.

28 Claims, 17 Drawing Sheets

(56) References Cited

U.S. PATENT DOCUMENTS

| | | | |
|---|---|---|---|
| 10,183,231 B1* | 1/2019 | Lowe | A63H 33/22 |
| 2005/0271351 A1 | 12/2005 | Thibault | |
| 2009/0097124 A1* | 4/2009 | Lundgren | G02B 27/0018 |
| | | | 359/601 |
| 2009/0185268 A1 | 7/2009 | Harada et al. | |
| 2011/0023215 A1 | 2/2011 | Obradovic | |
| 2015/0124243 A1* | 5/2015 | Stockdill | G01C 3/04 |
| | | | 42/122 |
| 2018/0314051 A1* | 11/2018 | Kammans | G02B 23/14 |

FOREIGN PATENT DOCUMENTS

| | | |
|---|---|---|
| EP | 0087661 B1 | 8/1986 |
| EP | 1435537 A1 | 7/2004 |
| GB | 1289726 | 9/1972 |
| WO | 2002/071457 A1 | 9/2002 |

\* cited by examiner

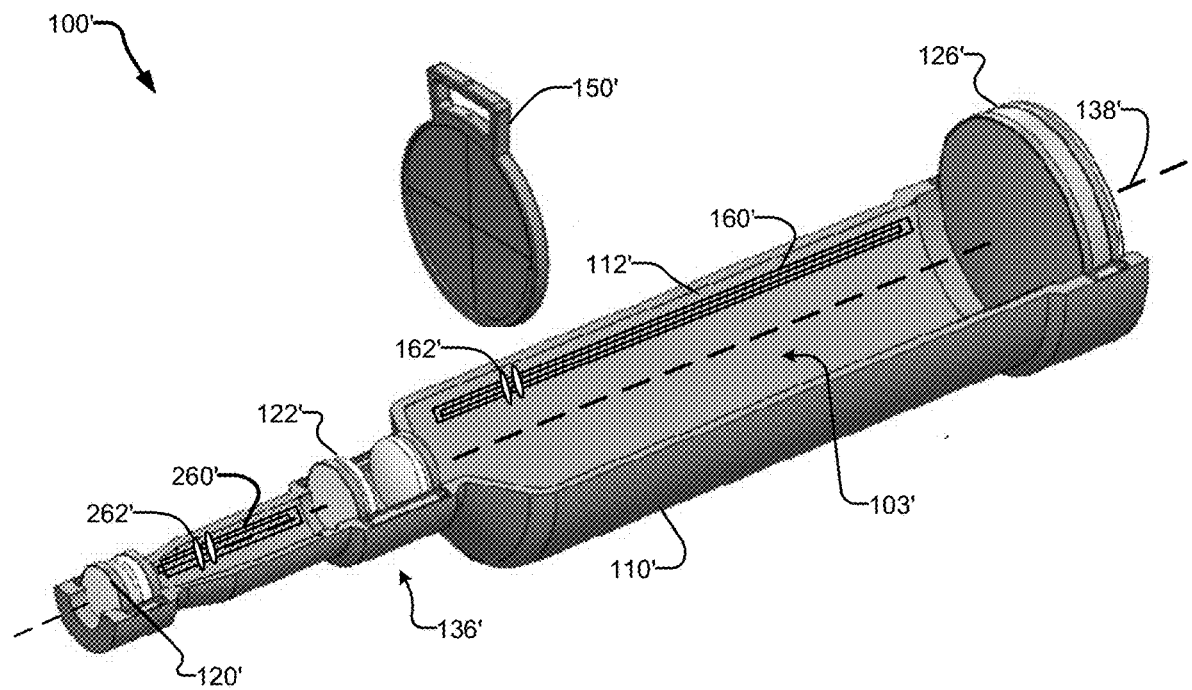
FIGURE 6
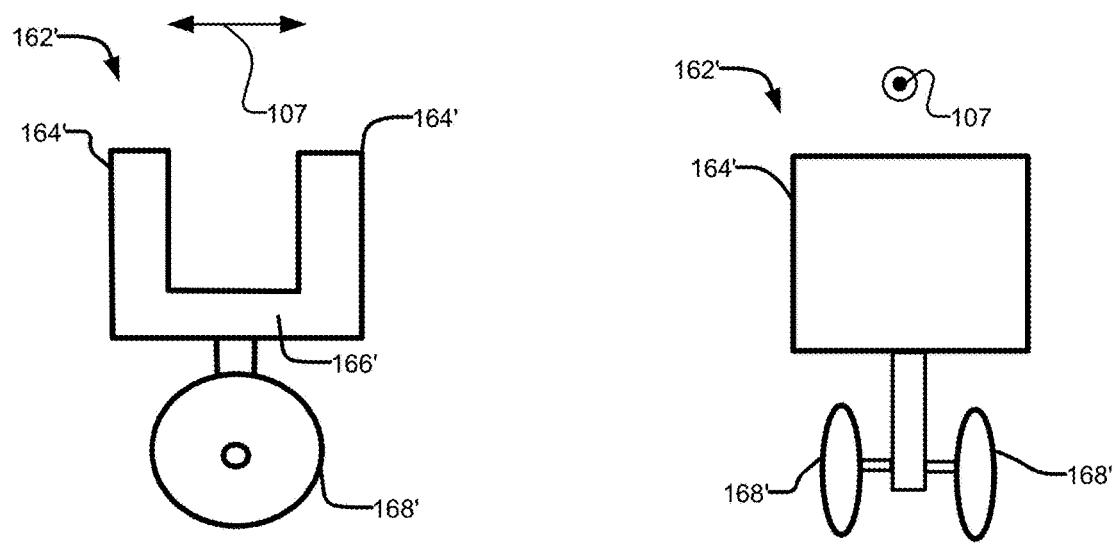
FIGURE 7A
FIGURE 7B

TELESCOPES AND OTHER OPTICAL INSTRUMENTS WITH VISUALLY ACCESSIBLE OPTICAL COMPONENTS

RELATED APPLICATIONS

This application is a continuation of Patent Cooperation Treaty (PCT) application No. PCT/CA2019/050092 having an international filing date of 25 Jan. 2019, which in turn claims the benefit of priority from, and the benefit of 35 USC 119(e) in relation to, U.S. application No. 62/622,815 (filed 26 Jan. 2018), U.S. application No. 62/659,597 (filed 18 Apr. 2018) and U.S. application No. 62/752,330 (filed 29 Oct. 2019). The applications referred to in this paragraph are all hereby incorporated herein by reference.

TECHNICAL FIELD

The present disclosure relates to telescopes and other optical instruments. In particular, the present disclosure relates to telescopes and other optical instruments with visually accessible optical components.

BACKGROUND

Current telescopes are limited in their educational value because they are typically constructed of optical components that are held within or at least partially within a fully enclosed housing. The fully enclosed housing does not permit visual accessibility to any of the optical components held therein or to the optical path between such components, especially when the telescope is being used to observe an object or scene. Further, the fully enclosed housing does not permit optical experiments that would help a user to gain an operational understanding of the optical and mechanical components within a telescope. To understand the components that form a telescope and their operation, one may need to take apart the telescope which is not always possible without permanent damage to the As such, the educational value of current telescopes is limited to the operation of a specific telescope and/or to schematic drawings which illustrate operational principles of the telescope. In the absence of such schematic drawings neither a true understanding of the optical and mechanical components within a telescope, nor a true understanding of the principles of optical imaging, can be easily achieved from current telescopes because of fully enclosed housing.

There is a general desire for optical instruments (like telescopes, for example) with visually accessible optical components. There is also a general desire for optical instruments (like telescopes, for example) that permit optical experiments.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an optical instrument with visually accessible optical components.

One aspect of the invention provides an optical instrument that permits optical experiments.

One aspect of the invention provides an optical instrument having an optical path cavity and one or more optical components held therein or at least partially therein. The optical instrument comprises an openable housing defining a housing aperture through the optical path cavity is viewable and a cover portion moveable to cover and uncover the housing aperture of the openable housing. The one or more optical components may be to the openable housing to receive and direct light along an optical path that extends through the optical path cavity. The optical instrument is convertible between an open configuration and a closed configuration by suitable movement of the cover portion relative to the housing. In the open configuration, the cover portion is moved relative to the openable housing to an open position which visually exposes the one or more optical components held within (or partially within) the optical path cavity via the housing aperture. In the closed configuration, the cover portion is moved relative to the openable housing to a closed which covers the housing aperture to visually conceal the one or more optical components.

One aspect of the invention provides an optical instrument having an optical path cavity, one or more optical components held in (or at least partially in) the optical path cavity, and a screen to be removably received in the optical path cavity. The optical instrument comprises an openable housing defining a housing aperture through which the optical path cavity is viewable and a cover portion moveable to cover and uncover the housing aperture of the openable housing. The one or more optical components may be fixed to the openable housing to receive and direct light along an optical path that extends through the optical path cavity. The optical instrument is convertible between an open configuration and a closed configuration by suitable movement of the cover portion relative to the openable housing. In the open configuration, the cover portion is moved relative to the openable housing to an open position which visually exposes the one or more optical components held within (or partially within) the optical path cavity via the housing aperture. Additionally, in the open configuration in some embodiments, the screen can be mounted to the openable housing within the optical path cavity via the housing aperture, so that an image of an object or scene viewed by the optical instrument is reproduced on the screen. The optical instrument may comprise a plurality of optical components and the screen may be mounted within the optical path cavity at a location on an optical path of the optical instrument that is between the plurality of optical components of the optical instrument, so that the image is reproduced on the screen by light that interacts with some, but not all of the plurality of optical components. In some embodiments, the screen may be mountable to the openable housing within the optical path cavity at a number of longitudinal locations so that images having different characteristics may be reproduced on the screen. In some embodiments, the screen is mounted to the openable housing by sliding the screen into transversely opening grooves defined by corresponding pairs of transversely extending protrusions. The cover portion is also moveable relative to the openable housing to a closed configuration. In the closed configuration, the cover portion is move to a closed position which covers the housing aperture to visually conceal the one or more optical components.

One aspect of the invention provides a method for observing an object or scene with a telescope. The method comprises adjusting the telescope to focus on the object or scene and moving a cover portion of the telescope relative to an openable housing of the telescope to visually expose one or more internal optical components held within an optical path cavity of the openable housing though a housing aperture defined by the openable housing.

One aspect of the invention provides a method for observing an object or scene with an optical instrument. The method comprises: adjusting the optical instrument to focus on the object or scene; moving a cover portion of the optical instrument relative to an openable housing of the optical instrument to visually expose one or more internal optical components held within an optical path cavity of the openable housing though a housing aperture defined by the openable housing; and mounting a screen to the openable housing in the optical path cavity through the longitudinal opening so that an image of the object or scene viewed by the optical instrument is reproduced on the screen. The optical instrument may comprise a plurality of optical components and the method may comprise mounting the screen within the optical path cavity at a location on an optical path of the optical instrument that is between the plurality of optical components of the optical instrument, so that the image is reproduced on the screen by light that interacts with some, but not all of the plurality of optical components. In some embodiments, the screen may be mountable to the openable housing within the optical path cavity at a number of longitudinal locations so that images having different characteristics may be reproduced on the screen. In some embodiments, mounting the screen to the openable housing comprises sliding the screen into transversely opening grooves defined by corresponding pairs of transversely extending protrusions.

Another aspect of the invention provides an optical instrument comprising: an openable housing defining a first and second housing apertures; a first cover portion engageable with the openable housing to visually conceal the first housing aperture; a second cover portion engageable with the openable housing to visually conceal the second housing aperture; and one or more optical components mounted to the openable housing located within or at least partially within the optical path cavity. The first and second cover portions and the openable housing together define an optical path cavity through which light travels for operation of the optical instrument. The first and second cover portions are moveable relative to the openable housing between: a closed position where the first and second cover portions are located to cover the respective housing apertures and visually conceal the optical components or at least portions of the one or more optical components; and an open position where the first and second cover portions are located to uncover the respective housing apertures and visually expose the one or more optical components or at least portions of the one or more optical components via the first and second housing apertures.

Another aspect of the invention provides an optical instrument comprising: an openable housing defining a first and second housing apertures; a cover portion engageable with the openable housing to visually conceal the first housing aperture, the cover portion and openable housing together defining an optical path cavity through which light travels for operation of the optical instrument; and one or more optical components mounted to the openable housing and located within or at least partially within the optical path cavity. The cover portion is moveable relative to the openable housing between a closed position where the cover portion is located to cover the first housing aperture to visually conceal the one or more optical components or at least portions of the one or more optical components; and an open position where the cover portion is located to uncover the first housing aperture and visually expose the one or more optical components or at least portions of the one or more optical components via the first housing aperture. One of the one or more optical components comprises at least one of a lens and a transmissive screen, the at least one of the lens and the transmissive screen mounted to the second housing aperture.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 6 shows a perspective view of a telescope according to another example embodiment in an open configuration and a screen which can be received in the telescope.

FIGS. 7A and 7B (collectively, FIG. 7) show orthogonal views of an example screen guide configured to receive, and slidably longitudinally position, a screen in the FIG. 6 telescope.

DESCRIPTION

Figure 1:
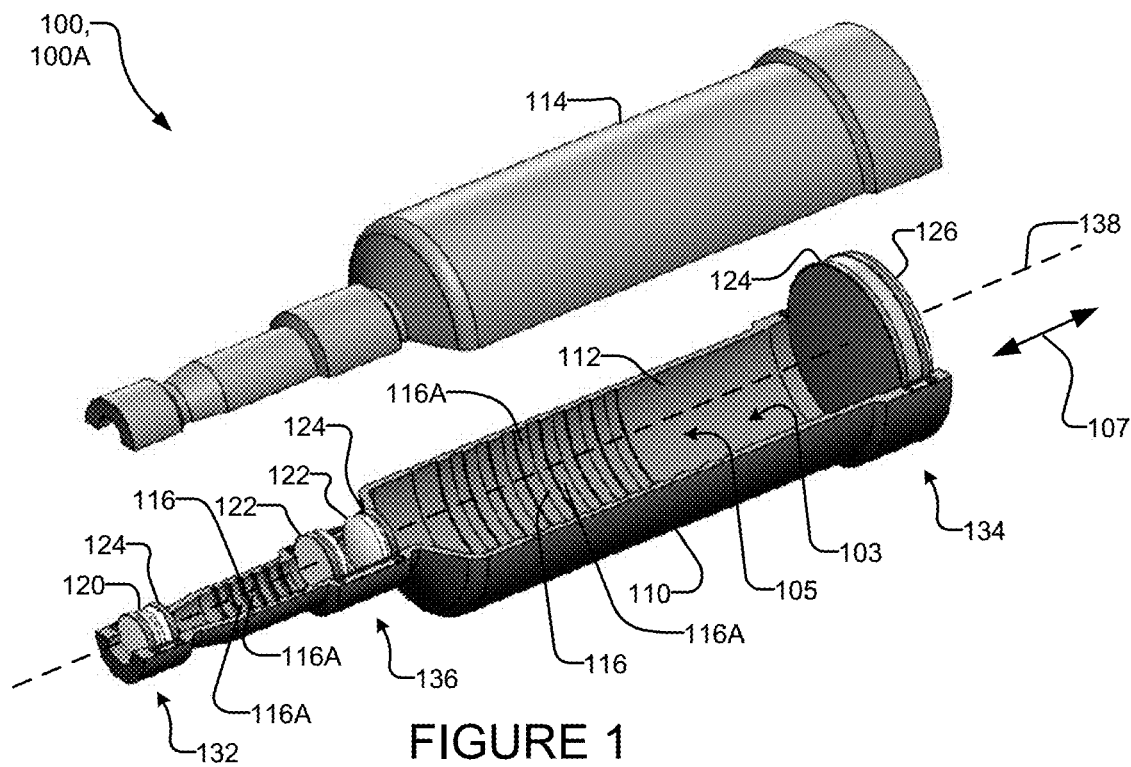
FIG. 1 shows a perspective view of a telescope according to an example embodiment in an open configuration.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used in this specification, the term "optical component" refers to a component that is operationally designed to refract, reflect, diffract or otherwise alter the characteristics of at least a portion of light incident on the component when such portion of light is output from the optical component. Examples of optical components include lenses, mirrors, beam splitters, polarizers and prisms.

As used in this specification, the term "optical instrument" refers to a device that interacts with light to enhance an image of an object or scene that is viewable or otherwise reproduceable through the optical instrument. An optical instrument has an optical path cavity (e.g. a hollow optical tube in the case of a telescope) and at least one optical component held within or at least partially within the optical path cavity. Examples of optical instruments include telescopes, finderscopes and eyepieces.

As used in this specification, the term "telescope" refers to an optical instrument that collects and interacts with light to enhance an image of a remote object or scene that is viewable or otherwise reproduceable through the optical instrument. Depending on their optical designs, telescopes can be classified in one of three groups: refracting, reflecting and catadioptric telescopes. A refracting telescope, for example, a binocular or monocular, uses an objective lens to form an image of a remote object or scene. A reflecting telescope, like a Newtonian telescope for example, uses a mirror or a combination of mirrors to reflect light and form an image of a remote object or scene. A catadioptric telescope, for example, a Maksutov telescope or a Schmidt telescope, uses both lenses and mirrors to form an image of a remote object or scene.

As used herein, the term "longitudinal" means extending lengthwise along an optical path axis of an optical instrument. An optical path of an optical instrument may not be linear through the entire instrument. For example, an optical instrument may comprise an eyepiece which has an optical path that is oriented differently than other part(s) of the optical instrument. In such cases, the term longitudinal may have different meanings for different parts of the optical instrument where the optical paths are differently oriented.

As used herein, the term "transverse" means extending at least partially in a direction perpendicular to the longitudinal direction (optical path axis) of an optical instrument. Where an optical instrument has multiple optical path orientations, the term transvers may have different meanings for different parts of the optical instrument where the optical paths are differently oriented.

The inventors have developed optical instruments (e.g. telescopes) with visually accessible optical components. In one example embodiment, the optical instrument has an optical path cavity (e.g. a hollow tube) and one or more optical components held therein or at least partially therein. The optical instrument comprises an openable housing defining a housing aperture through which the optical path cavity is viewable and a cover portion moveable to cover and to uncover the housing aperture of the openable housing. The one or more optical components may be securely fixed to the openable housing to receive and direct light along an optical path that extends through the optical path cavity. The optical instrument is convertible between an open configuration and a closed configuration by suitable movement of the cover portion relative to the openable housing. In the open configuration, the cover portion is moved relative to the openable housing to an open position which visually exposes the one or more optical components held within (or partially within) the optical path cavity via the housing aperture. In the closed configuration, the cover portion is moved relative to the openable housing to a closed position which covers the housing aperture to visually conceal the one or more optical components. In some embodiments, an interior surface of the openable housing has transversely extending grooves defined by corresponding pairs of transversely extending protrusions for positioning a screen therein to show an image of the object or scene created by the optical instrument (or a portion of the optical components of the optical instrument) on the screen.

Figure 2:
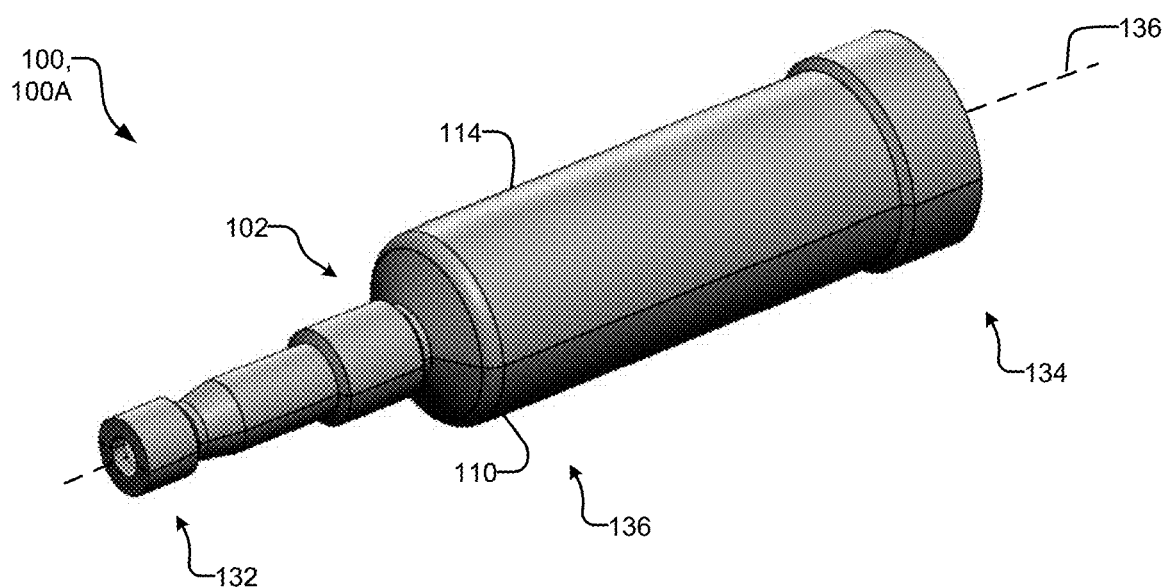
FIG. 2 shows a perspective view of the FIG. 1 telescope in a closed configuration.

FIGS. 1 and 2 show an optical instrument 100 (a telescope 100A in the case of the illustrated embodiment) according to an example embodiment. Telescope 100A comprises a hollow tube 102 which is generally elongated in a longitudinal direction (indicated by double-headed arrow 107) and which defines an optical path cavity 103 (i.e. a cavity through which light is transmitted in a direction generally aligned with an optical axis 138) and optical components 120, 122, 126 fixedly held therein. In the illustrated embodiment, hollow tube 102 comprises a pair of parts—an openable housing 110 that defines a housing aperture 105 and a cover portion 114 that is moveable, relative to openable housing 110, to cover or expose housing aperture 105. In the illustrated embodiment of FIGS. 1 and 2, cover portion 114 is moveable to an open position, which exposes housing aperture 105, by moving cover portion 114 transversely away from openable housing 110. Once cover portion 114 is moved to the open position, optical path cavity 103 and optical components 120, 122, 126 held therein are viewable through housing aperture 105. Openable housing 110 of the illustrated embodiment comprises an interior surface 112 that defines a portion of optical path cavity 103. Interior surface 112 may comprise a plurality of transversely extending and longitudinally spaced apart protrusions 116A that define grooves 116 between corresponding pairs of protrusions 116A. As shown in FIG. 1, optical components 120, 122, 126 are securely fixed to interior surface 112 of openable housing 110 to receive and direct light along an optical path through optical path cavity 103 in a direction generally aligned with optical axis 138.

Hollow tube 102 comprises two longitudinally spaced apart ends: an eyepiece end 132 and an objective lens end 134. Eyepiece end 132 is to be oriented towards the eye when a user looks through telescope 100A. Objective lens end 134 is to be oriented towards the object to be viewed and/or imaged. Telescope 100A also comprises a relay lens section 136 which houses relay lens(es) 122, positioned between eyepiece end 132 and objective lens end 134. In other embodiments, hollow tube 102 (including openable housing 110 and cover portion 114) may have any other suitable shapes. Hollow tube 102 may be dimensioned to capture sufficient light to form bright, clear images of remote objects with low distortion.

In the illustrated embodiment of FIGS. 1 and 2, optical device 100 comprises openable housing 110 and cover portion 114 which have shapes that are similar to each other, except possibly where openable housing 110 and cover portion 114 engage one another when cover portion 114 is in its closed position. As discussed above, optical components 120, 122, 126 may be fixedly held in openable housing 110. For example, surface 112 of openable housing 110 may be shaped to fixedly hold optical components 120, 122, 126 using friction fits (e.g. in suitably dimensioned grooves, defined by surface 112). Additionally or alternatively, optical components 120, 122, 126 may be fixed to surface 112 using suitable adhesive, set screws or other fasteners and/or the like. As is known in the art, optical tube 102 (and in the illustrated embodiment, openable housing 110 and cover portion 114) may be dimensioned to capture sufficient light and to provide sufficient colour contrast to enhance the image of remote objects and/or scenes.

When cover portion 114 is in its closed position, cover portion can engage with openable housing 110 in any manner known in the art. For example, cover portion 114 and openable housing 110 can be engaged with the help of mating pegs (which may be integral to one or both of cover portion 114 and openable housing 110 or separate components) and holes (not expressly shown). Additionally or alternatively, cover portion 114 and open housing 110 may be hingedly connected, slidably connected, deformably connected (e.g. so that one or both of cover portion 114 and openable housing 110 is deformed (and, optionally partially restored) to make the connection) and/or the like.

Optical instrument 100 is convertible between an open configuration (shown in FIG. 1) and a closed configuration (shown in FIG. 2) by suitable movement of cover portion 114 relative to openable housing 110. In the illustrated embodiment, cover portion 114 is removably engaged with openable housing 110. In the open configuration, cover portion 114 is moved relative to openable housing 110 to visually expose optical components 120, 122, 126 held within optical path cavity 103 via housing aperture 105. In particular in the case of the embodiment shown in FIGS. 1 and 2, cover portion 114 is removed from openable housing 110. The removal of cover portion 114 does not alter how light passes through telescope 100A, and does not alter the locations of optical components 120, 122, 126. Thus, when telescope 100A is in its open configuration, a user is able to observe and understand the optical and mechanical structures within telescope 100A when telescope 100A is being used to observe remote objects. In some embodiments, cover portion 114 and openable housing 110 may be connectable to one another using other techniques (e.g. hinged, slidable, deformable or other types of connections) that permit disconnection of cover portion 114 from openable housing 110 and corresponding movement of cover portion 114 from a closed position to an open position and vice versa. For example, to visually expose optical components 120, 122, 126 via housing aperture 105, cover portion 114 can be pivoted or slid or otherwise moved relative to openable housing 110.

FIG. 2 shows optical instrument 100 in a closed configuration. In the closed configuration, cover portion 114 covers housing aperture 105 so that it is not possible to see into optical path cavity 103. Cover portion 114 effectively visually conceals optical components 120, 122, 126. In some embodiments, cover portion 114 and housing 110 may be connectable to one another using other techniques (e.g. hinged, slidable, deformable or other types of connections) that permit connection of cover portion 114 to openable housing 110 and corresponding movement of cover portion 114 from an open position to a closed position and vice versa. To visually conceal optical components 120, 122, 126 by covering housing aperture 105, cover portion 114 can be pivoted inwardly to engage with open housing 110, slid over housing aperture 105 or otherwise moved relative to openable housing 110.

Openable housing 110 is configured to fixedly secure several optical components 120, 122, 126. In some embodiments, one or more annular tube rings 124 may be inserted along with optical components 120, 122, 126 into suitably shaped grooves in surface 112 of openable housing 110 to act as shims and to thereby provide a tight fit between optical components 120, 122, 126 and the groove-defining protrusions in surface 112 of openable housing 110. As discussed herein, other suitable mounting or fastening techniques may be used to fixedly secure optical components 120, 122, 126 to surface 112. When fixedly mounted to openable housing 110, optical components 120, 122, 126 may be located such that the cross-sectional centers of some of optical components 120, 122, 126 are axially aligned with optical axis 138.

Figure 4:
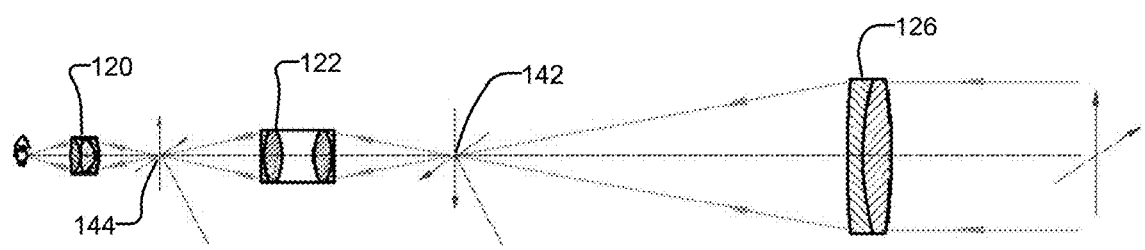
FIG. 4 schematically depicts the optical components of the FIG. 1 telescope and how light travels through these optical components.

In the illustrated embodiment, optical component 126 is an objective lens. Objective lens 126 is fixed to interior surface 112 at objective lens end 134 of optical path cavity 103. Objective lens end 134 of optical path cavity 103 may have an inner diameter (or cross-sectional area) that is equal to or larger than the outside diameter (or cross-sectional area) of objective lens 126. As shown in FIG. 4, objective lens 126 captures incident light and has a first focal point 142 located within optical path cavity 103 creating an inverted image of remote objects/scenes in the plane of first focal point 142. First focal point 142 may be positioned inside optical path cavity 103 between objective lens 126 and relay lens(es) 122.

In the illustrated embodiment optical component 122 comprises one or more relay lens(es). Relay lens(es) 122 is/are fixed to interior surface 112 and within optical path cavity 103 at a location longitudinally spaced apart from both objective lens end 134 and eyepiece end 132 of telescope 100A at or near relay lens section 136. Optical path cavity 103 (in relay lens section 136) may have an inner diameter (or cross-sectional area) that is equal to or larger than the outside diameter (or cross-sectional area) of relay lens(es) 122. Relay lens(es) 122 re-invert the image of remote objects/scenes and, as shown in FIG. 4, provides a second focal point 144 located in optical path cavity 103, thereby creating a re-inverted (upright) image of remote objects/scenes in the plane of second focal point 144. Second focal point 144 may be positioned in a location that is between relay lens(es) 122 and optical component 120 and longitudinally spaced apart from relay lens(es) 122 and optical component 120.

In the illustrated embodiment, optical component 120 comprises one or more eyepiece lens(es). Eyepiece lens(es) 120 is/are fixed to interior surface 112 at eyepiece end 132 of optical path cavity 10. Eyepiece end 132 of optical path cavity 103 may have an inner diameter (or cross-section) that is equal to or larger than the outside diameter (or cross-section) of eyepiece lens(es) 120. Eyepiece lens(es) 120 magnify the re-inverted image of remote objects/scenes.

Figure 3:
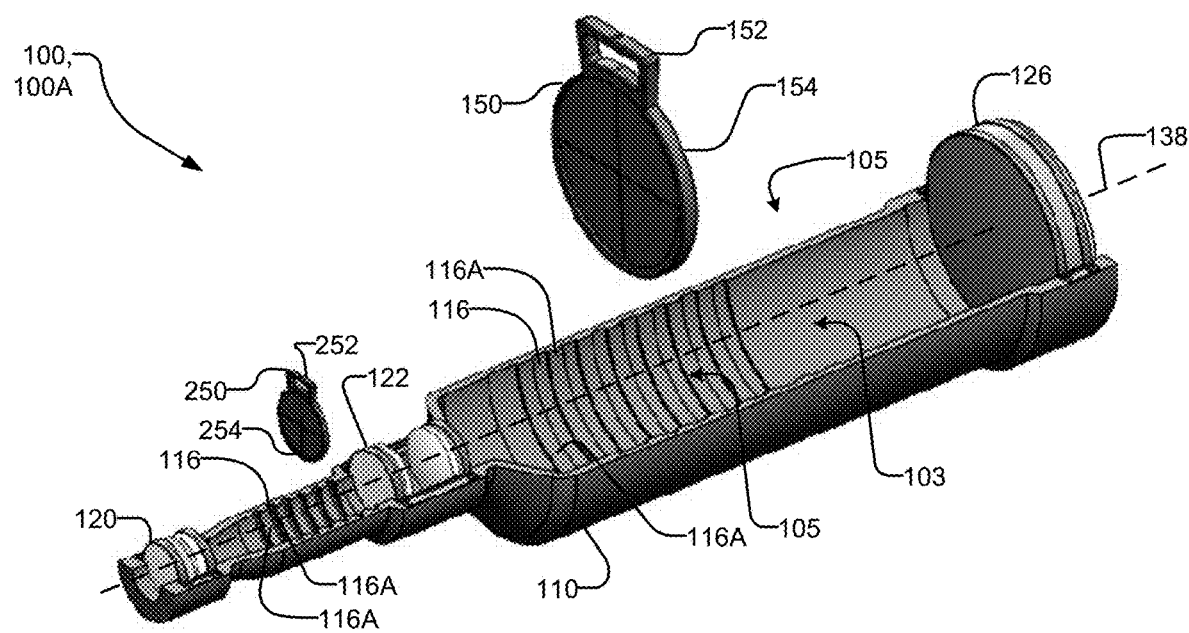
FIG. 3 shows a partial perspective view of the FIG. 1 telescope in an open configuration and a pair of screens being operationally receivable in the FIG. 1 telescope.

In some embodiments, optical instrument 100 permits optical experiments when optical instrument 100 is in the open configuration. Referring to FIG. 3, surface 112 of openable housing 110 comprises transversely extending protrusions 116A which define corresponding transversely extending grooves 116. One such transversely extending groove 116 (or a surface of one such protrusion 116A) may be longitudinally located within a transversely extending plane that intersects first focal point 142. Another one such transversely extending groove 116 (or a surface of one such protrusion 116A) may be longitudinally located within a transversely extending plane that intersects second focal point 144. Other transversely extending grooves 116 are located within transversely extending planes that are longitudinally spaced apart from, and on one or both longitudinal sides of, first and second focal points 142, 144. In some embodiments, transversely extending grooves 116 on one or both longitudinal sides of first focal point 142 are longitudinally spaced 0.5-5 mm apart. In some embodiments, this longitudinal spacing is 1-2 mm. In some embodiments, transversely extending grooves 116 on one or both longitudinal sides of second focal point 144 are longitudinally spaced 0.5-5 mm apart. In some embodiments, this longitudinal spacing is 1-2 mm.

As shown best in FIG. 3, when optical instrument 100 is in the open configuration, a screen 150 having a generally planar panel 154 having a generally planar surface (not expressly enumerated) configured to display an image can be inserted through housing aperture 105 and into one of transversely extending grooves 116 in a vicinity of first focal point 142 (FIG. 4). Screen 150, of the illustrated embodiment comprises a handle 152 which may help with the insertion and removal of screen 150 into grooves 116, although this is not necessary. In the illustrated embodiment, handle 152 comprises a hollow tubular cross section. In some embodiments, handle 152 can have other suitable shapes. The generally planar surface of panel 154 may be configured to show an image from an interior of telescope 100A (i.e. from within optical path cavity 103) by reflecting light that passes partially through optical instrument 100. In the illustrated embodiment, the screen 150 can be inserted into one of grooves 116 in a vicinity of first focal point 142 (e.g. at first focal point 142 or on either or both longitudinal sides of first focal point 142) to display an image on the generally planar surface of panel 154. Such an image may reflect light that passes through objective lens 126, but not through relay lens(es) 122 or eyepiece lens(es) 120. Panel 154 of the illustrated embodiment has a generally circular cross section and is longitudinally dimensioned to be inserted in one of transversely extending grooves 116 (e.g. by friction fit). Panel 154 may have a diameter (or cross-section) that is equal to or smaller than the inner diameter (or cross-section) of the respective transversely extending groove 116 in optical path cavity 103 in a vicinity of first focal point 142.

In the illustrated embodiment of FIG. 3, a second screen 250 may additionally or alternatively be provided for inserting through housing aperture 105 and into one of transversely extending grooves in a vicinity of second focal point 144 (FIG. 4) for displaying images that passes partially through optical instrument 100. Second screen 250 may have features similar to any of those described herein for panel 150 and are referenced using similar reference numerals, except that the features of panel 250 may be preceded by the reference digit "2" (rather than "1"). In the illustrated embodiment, second screen 250 can be inserted into one of grooves 116 in a vicinity of second focal point 144 (e.g. at second focal point 144 or on either or both longitudinal sides of second focal point 144) to display an image on the generally planar surface of panel 254. Such an image may reflect light that passes through objective lens 126, and through relay lens(es) 122, but not through eyepiece lens(es) 120.

Figure 5A:
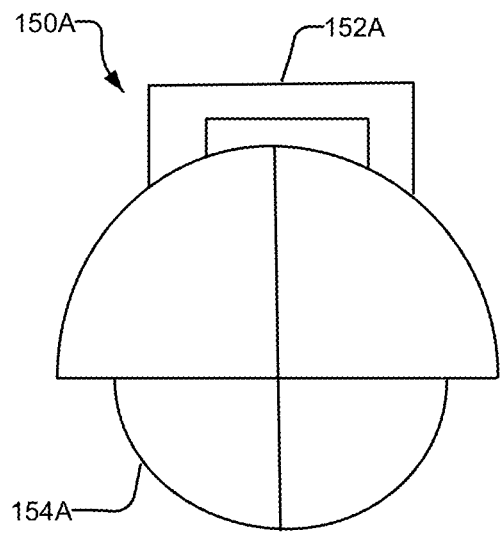
FIGS. 5A-5C (collectively, FIG. 5) shows example embodiments of a screen to be received in the FIG. 1 telescope.
Figure 5B:
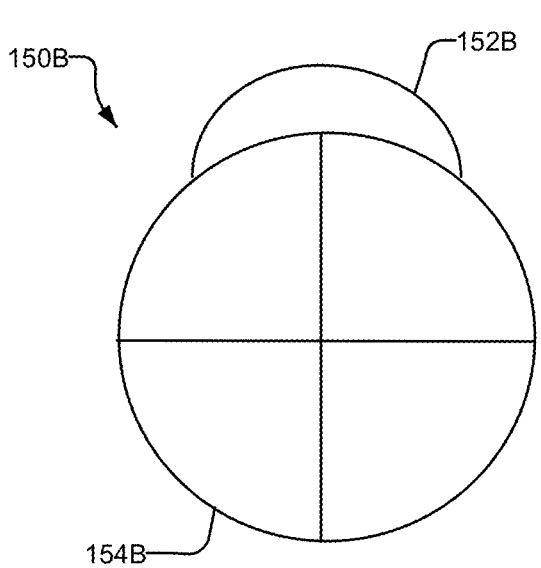
Figure 5C:
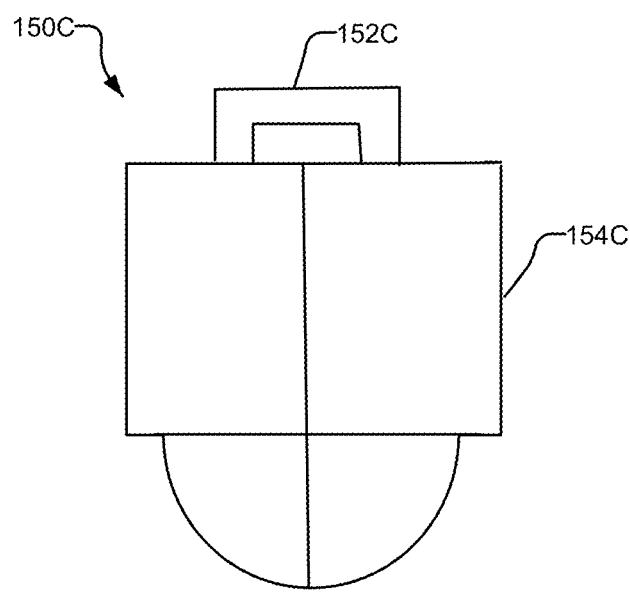

A number of different embodiments of screen 150 are shown in FIGS. 5A-5C with like reference numerals to screen 150 shown in FIG. 3 with appended alphabetic indicators A, B, C. FIG. 5A shows a screen 150A having a non-circular panel 154A. The distal (from handle 152A) portion of panel 154A has a semi-circle cross section with a diameter that is equal to or smaller than the inner diameter of the respective transversely extending groove 116. The proximate (to handle 152A) portion of panel 154A has a semi-circle cross section with a diameter that is larger than the inner diameter of the respective transversely extending groove 116. FIG. 5B shows a screen 150B with a curved handle 152B without an aperture. FIG. 5C shows a screen 150C having a non-circular panel 154C. The distal (from handle 152C) portion of panel 154C has a semi-circle cross section with a diameter that is equal to or smaller than the inner diameter of the respective transversely extending groove 116. The proximate (to handle 152C) portion half of panel 154C has a rectangular cross section with a transverse width that is larger than the inner diameter of the respective transversely extending groove 116. Screen 250 may be provided with any of the features of any of the screens 150A, 150B, 150C shown in FIGS. 5A-5C and/or described herein.

When screen 150 is inserted into one of transversely extending grooves 116 in vicinity of first focal point 142, the image from a portion of telescope 100A is projected onto screen 150. Screen 150 can be inserted into any one of transversely extending grooves 116 and thus it is possible to investigate the principles of optical lenses and imaging. One principle of optical lenses and imaging is $$\frac{1}{f} = \frac{1}{u+1} + \frac{1}{v}$$

where:
u=the object distance=the distance between the target object and the optical element;
v=image distance=when the screen shows an image of the target object, the distance between the optical element and the screen; and
f=focal length of the optical element.

To gain an understanding of this principle, a user may shift screen 150 within housing 110 by inserting screen 150 in different transversely extending grooves 116 (and correspondingly different longitudinal positions). The user may thus be able to determine a longitudinal location of first focal point 142 of telescope 100A within optical path cavity 103 and/or a distance of an object relative to optical instrument 100 (or relative to objective lens 126). For example, when an object to be viewed and/or imaged is infinitely far away from telescope 100A, an image of the remote object is formed at first focal point 142. In another example, assuming that first focal point 142 is 300 mm from objective lens 126, when an object to be viewed and/or imaged is 20 m away from telescope 100A, an image of the object will be formed 4.569 mm away from first focal point 142. When an object to be viewed is 5 m away from telescope 100A, an image of the object will be formed 19.149 mm away from first focal point 142. Further, the user will be able to see how optical images are inverted and then re-inverted along optical axis 138. Screen 250 may be similarly used to determine a longitudinal location of second focal point 144 of telescope 100A within optical path cavity 103 and/or observe how optical images are re-inverted by relay lens(es) 122.

To use telescope 100A to observe an object or scene, a user adjusts telescope 100A to focus on the object or scene. To see optical components 120, 122, 126 held within open housing 110 of telescope 100A, the user can move cover portion 114 relative to openable housing 110 to its open position to visually expose optical components 120, 122, 126 held within open housing 110 via housing aperture 105. The exposure of optical components 120, 122, 126 via housing aperture 105 (when cover portion 114 is in its open position) does not alter how light passes through telescope 100A, and thus the user is able to observe and understand the optical and mechanical structures within telescope 100A when telescope 100A is being used to observe the object or scene. When cover portion 114 is removed, the user can insert screen 150 into openable housing 110 through housing aperture 105 in a vicinity of first focal point 142 (e.g. at first focal point 142 or on either or both sides of first focal point 142), so that an image from telescope 100A is projected onto screen 150. The user can shift screen 150 longitudinally within open housing 110 by inserting screen 150 in different transversely extending grooves 116. For example, the user can position screen 150 at first focal point 142 and then position screen 150 at a location spaced longitudinally from first focal point 142. Screen 250 can be similarly used in a vicinity of second focal point 144 (e.g. at second focal point 144 or on either or both sides of second focal point 144). To cover open housing 110 thereby visually conceal optical components 120, 122, 126, the user can place, pivot inwardly, or slid closed cap 114 to cover housing 110.

FIG. 6 shows another example embodiment of telescope 100A'. Telescope 100A' is substantially similar to telescope 100A shown in FIGS. 1-3, and like elements are illustrated with like reference numerals annotated with the prime symbol '. Telescope 100A' differs from telescope 100A primarily in that open housing 110' of telescope 100A' does not have transversely extending grooves on its interior surface for positioning a screen therein. Instead, housing 110' has a longitudinally extending sliding mechanism configured to longitudinally position screen 150' in optical path cavity 103'. Although screen 250' is not expressly shown in FIG. 6, telescope 100A' may be provided with a similar sliding mechanism to longitudinally position screen 250' in optical path cavity 103'.

In the illustrated embodiment of FIG. 6, openable housing 100' comprises one or more longitudinally extending slots 160', each coupled to a screen guide 162'. Screen guide 162' is shaped to slide along its respective longitudinally extending slot 160'. Additionally, screen guide 162' is configured to hold screen 150' in so that the planar surface of screen 150' extends in generally transverse directions and to slidably position screen 150' longitudinally along axial centreline 138'. Longitudinally extending slots 160' may be located and dimensioned to position screen 150' in a vicinity of first focal point 142 (FIG. 4)—e.g. at first focal point 142 or on either or both sides of first focal point 142 and/or between objective lens 126' and relay lens(es) 122'. Telescope 100A' may additionally or alternatively comprise a second set of one or more longitudinally extending slots 260' and corresponding screen guides 262' for positioning screen 250' in a vicinity of second focal point 144—e.g. at second focal point 144 or on either or both sides of second focal point 144 and/or between relay lens(es) 122' and eyepiece lens(es) 120'. With the exception of their location within optical path cavity 103', slots 260', screen guides 262' and their operation with respect to screen 250' may be similar to slots 160', screen guides 162' and their operation with respect to screen 150' described herein and, consequently, slots 260', screen guides 262' are not discussed further herein.

as shown best in FIGS. 7A and 7B, screen guide 162' may comprise two prongs 164' projecting from a base 166'. Prongs 164' and base 166' form a U-shaped cross section. Two prongs 164' may be spaced apart at a distance that is approximately the same as the longitudinal dimension of screen 150' so that screen 150' can be inserted between prongs 164' with a friction fit. Base 166' of the illustrated embodiment may be connected to a set of rollers 168'. Rollers 168' may be configured to enable screen guide 162' to be rolled longitudinally along slots 160' within openable housing 110'. When coupled to longitudinal slots 160', rollers 168' are located within slots 160' and prongs 164' and base 166' are located outside of slots 160' in optical path cavity 103'. In some embodiments, rollers 168' may be replaced by suitable slide bearings for slidable longitudinal movement of screen guide 162' longitudinally along slots 160' in optical path cavity 103'.

In some embodiments, prongs 164' of screen guide 162' are wide enough so that one screen guide 162' is sufficient to hold and stabilize screen 150' and slide screen 150' to a desired longitudinal position. In some embodiments, pluralities of screen guides 162' and longitudinal slots 160' may be provided to hold and stabilize screen 150' and slide screen 150' to a desired longitudinal position.

In some embodiments, to assist with optical experiments, openable housing 110' may be marked with graduation lines to indicate the distance between objective lens 126' and screen 150' or the distance between relay lens(es) 122' and screen 150' or the distance between first focal point 142 and screen 150'. For example, a user positions screen 150' between objective lens 126' and relay lens(es) 122' and longitudinally slides screen 150' to a desired position. When screen 150' shows the image of a target object in focus, the distance between screen 150' and objective lens 126' may be understood to be the image distance. The user may be able to easily determine the image distance by referencing the marked gradation lines.

Figure 8:
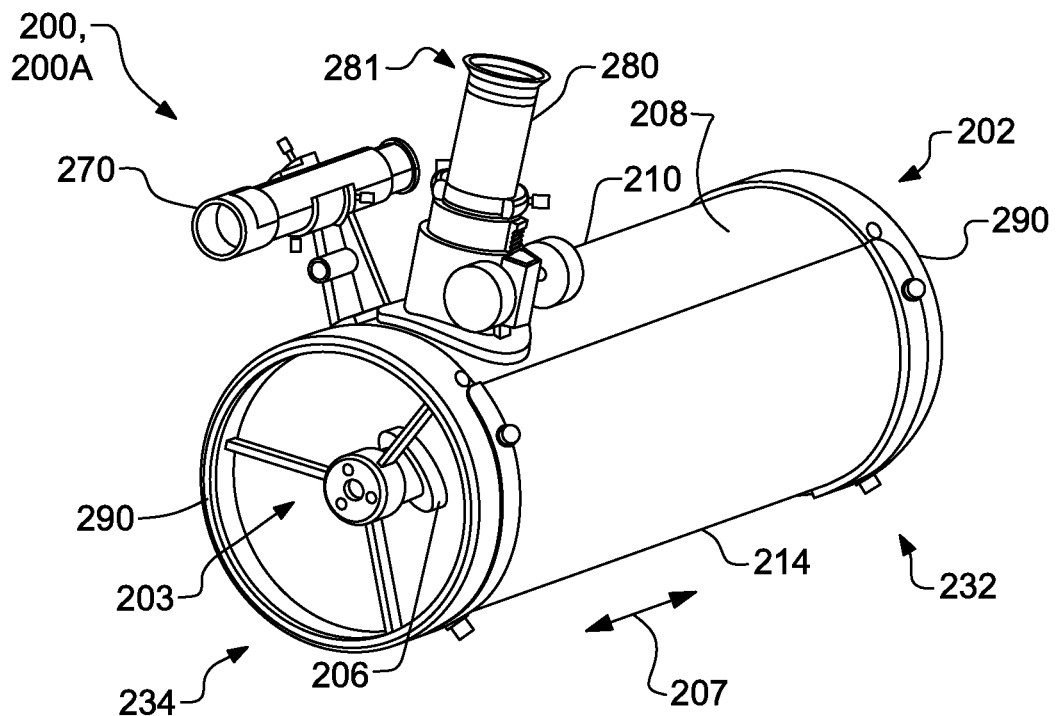
FIG. 8 shows a perspective view of a telescope with a finderscope and an eyepiece according to an example embodiment in a closed configuration.
Figure 9:
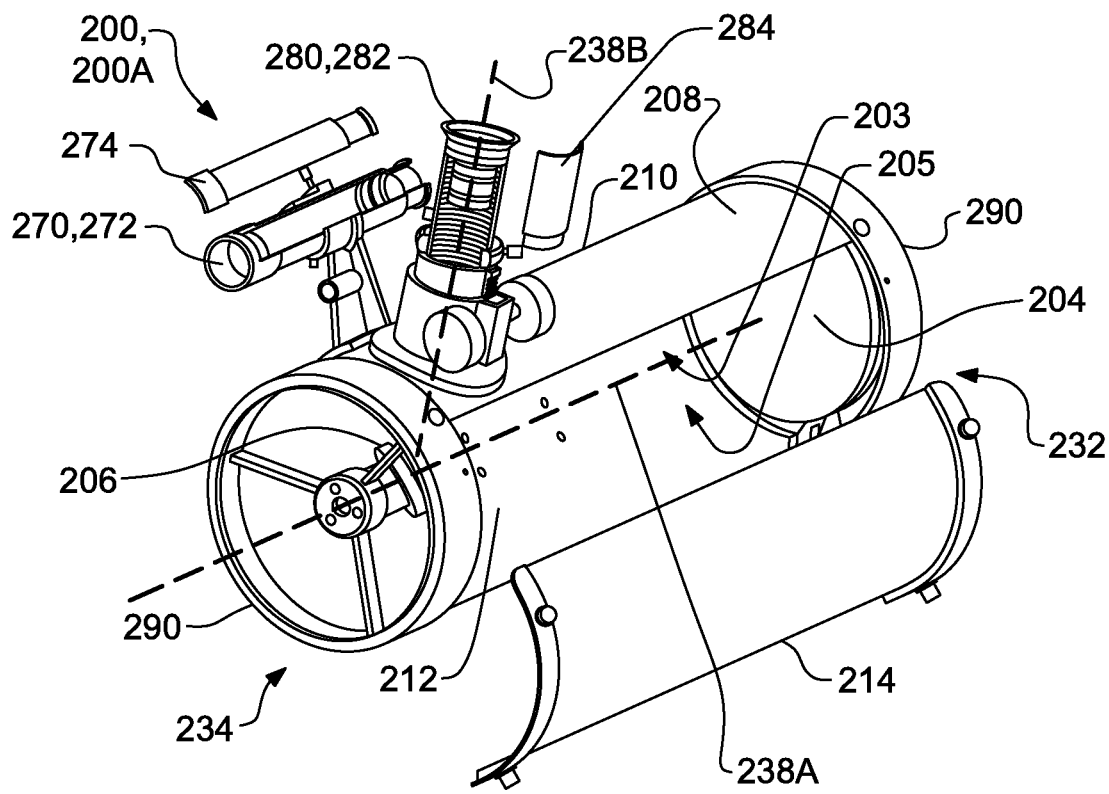
FIG. 9 shows a perspective of the FIG. 8 telescope in an open configuration.

FIGS. 8 and 9 show optical instrument 200 (e.g. a telescope 200A in the case of the illustrated embodiment) according to another example embodiment. Telescope 200A represents a so-called Dobsonian telescope. Elements of telescope 200A that correspond to elements of telescope 100A are illustrated with like reference numerals that have been incremented by 100.

Telescope 200A comprises a main hollow tube 202 which is generally elongated in a longitudinal direction (indicated by double headed arrow 207) and which defines an optical path cavity 203 (i.e. a cavity through which light is transmitted in a direction generally aligned with main optical axis 238A) and optical components 204, 206 held fixedly therein. Telescope 200A of the embodiment shown in FIGS. 8 and 9 further comprises a finderscope 270 and an eyepiece 280 that are coupled to an exterior surface 208 of main hollow tube 202.

In the illustrated embodiment of FIGS. 8 and 9, main hollow tube 202 has a generally hollow tubular shape with two ends: a mirror end 232 and an aperture end 234. Each end 232, 234 is coupled to a corresponding fixing ring 290. Aperture end 234 is oriented towards the object/scene to be viewed or imaged and receives light through an aperture defined by main hollow tube 202 and/or fixing ring 290 at aperture end 234. In some embodiments, telescope 200A may comprise an optical component (e.g. a correcting lens) at aperture end 234. Light transmitted through aperture end 234 and into optical path cavity travels generally along main, longitudinally oriented, optical axis 238A, where it reflects from optical component 204, to travel in the opposing direction along main optical axis 238A before impinging on optical component (mirror) 206, where the light is directed into eyepiece 280. This optical path of light through optical instrument 200 is shown best in FIG. 10. In the illustrated embodiment, eyepiece 280 is oriented generally transversely to longitudinal direction 207 and main optical axis 238A to provide an eyepiece optical axis 238B, but this is not necessary. In some embodiments, eyepiece 280 may have other orientations. In some embodiments, eyepiece 280 may be coaxial with optical axis 238A and located at aperture end 234 of optical instrument 200.

In the illustrated embodiment of FIGS. 8 and 9, main hollow tube 202 comprises an openable housing 210 that defines a housing aperture 205 and a cover portion 214 that is moveable relative to openable housing 210 to cover or expose housing aperture 205. In the illustrated embodiment of FIGS. 8 and 9, cover portion 214 is moveable to an open position, which exposes housing aperture 205. Cover portion 214 may be moved to its open position using any of the techniques and/or mechanisms discussed above in connection with cover portion 114. Once cover portion 214 is moved to its open position, optical path cavity 203 and optical components 204, 206 held therein are viewable through housing aperture 205. Openable housing 210 of the embodiment illustrated in FIGS. 8 and 9 comprises an interior surface 212 that defines a portion of optical path cavity 203. As shown in FIG. 9, openable housing 210 is configured to securely hold optical components 204, 206 therein and to enable optical components 204, 206 to receive and direct light along main, longitudinally extending optical path 238A between optical components 206 and 204 in optical path cavity 203. Openable housing 210 also defines an exit aperture (not expressly visible) that is aligned with eyepiece 280 so that light is reflected from optical component (secondary mirror) 206 in a direction generally aligned with eyepiece optical axis 238B. As discussed above, eyepiece 280 and eyepiece optical axis 238B of the illustrated embodiment extend in a transverse direction, but this is not necessary. Secondary mirror 206 may be oriented to direct light along eyepiece optical axis 238B.

As mentioned briefly above, optical instrument 200 is convertible between an open configuration (shown in FIG. 9) and a closed configuration (shown in FIG. 8) by suitable movement of cover portion 214 relative to openable housing 210. In the illustrated embodiment of FIGS. 8 and 9, cover portion 214 is removably engaged with openable housing 210. In the open configuration, cover portion 214 is moved relative to openable housing 210 to visually expose optical components 204, 206 held within (or partially within) openable housing 210 via housing aperture 205. In particular in the case of the embodiment shown in FIGS. 8 and 9, cover portion 214 is removed from openable housing 210 to move cover portion 214 to its open configuration. The removal of cover portion 214 does not alter how light passes through telescope 200A and does not alter the locations of optical components 204, 206. Thus, when telescope 200A is in its open configuration, a user is able to observe and understand the optical and mechanical structures within telescope 200A when telescope 200A is being used to observe remote objects. In some embodiments, cover portion 214 and openable housing 210 may be connectable to one another using any of the techniques described herein for cover portion 114 and openable housing 110. FIG. 8 shows optical instrument 200 in the closed configuration. In the closed configuration, cover portion 214 covers housing aperture 205, so that it is not possible to see into optical path cavity 203. Cover portion 214 effectively visually conceals optical components 202, 204 held within openable housing 210.

Figure 10:
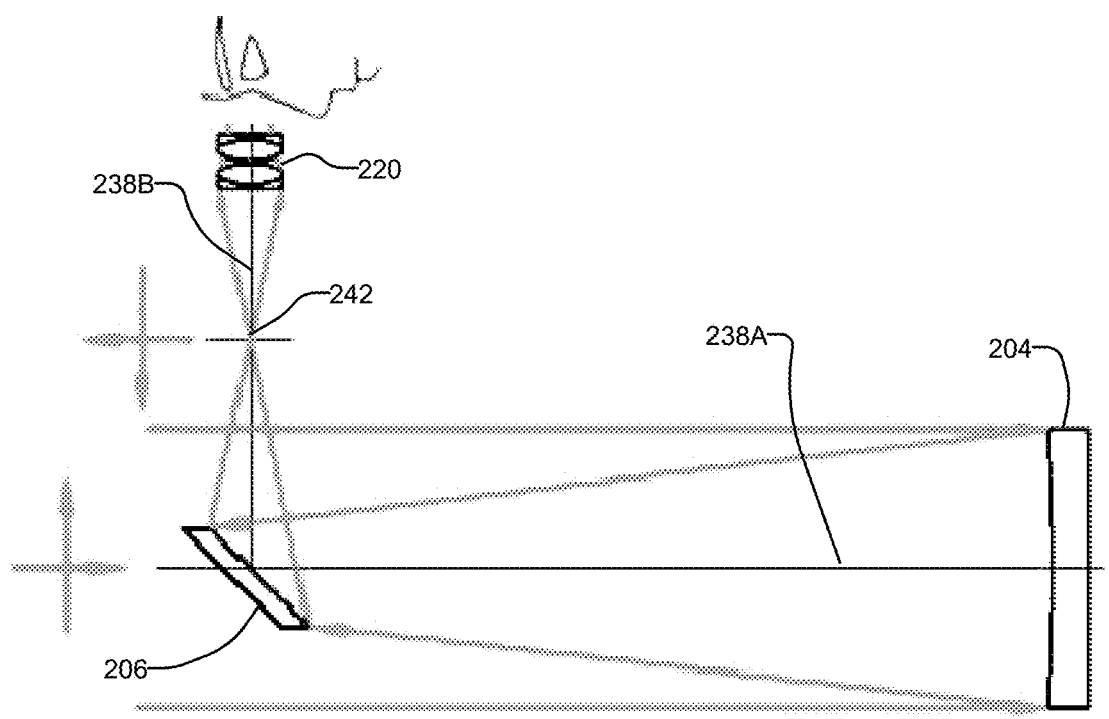
FIG. 10 schematically depicts the optical components of the FIG. 8 telescope and how light travels through these optical components.

Optical components 204, 206 are held securely within or partially within openable housing 210. Optical components 204, 206 are configured (e.g. shaped and/or located) to direct light received within openable housing 210 to eyepiece 280. FIG. 10 schematically depicts the travel of light through optical instrument 200 of the illustrated embodiment shown in FIGS. 8 and 9 and in particular through optical path cavity 203. In the illustrated example, optical component 204 comprises a primary mirror and is positioned proximate mirror end 232. Primary mirror 204 of the embodiment illustrated in FIGS. 8 and 9 is fixed to interior surface 212 of openable cavity and/or to fixing ring 290 at or near mirror end 232 of optical instrument 200 and may have a generally circular shape. A reflective (secondary) mirror 206 is positioned proximate aperture end 234 of optical instrument 200 and is configured (e.g. shaped and/or positioned) to direct the light reflected by primary mirror 204 through exit aperture and then into eyepiece 280 in a direction generally oriented along eyepiece optical axis 238B. Secondary mirror 206 may be fixed in place in optical path cavity 203 by fixing ring 290. In some embodiments, optical instrument may comprise a corrective lens at aperture end 234 of optical instrument 200. Such a corrective lens may be located longitudinally closer to aperture end 234 than secondary mirror 206.

Telescope 200A of the embodiment shown in FIGS. 8 and 9 comprises finderscope 270 and eyepiece 280 that are fixed to an exterior surface 208 of openable housing 210. In practice, finderscope 270 may be used to locate a target object and aim main optical axis 238A toward the target object.

Figure 11:
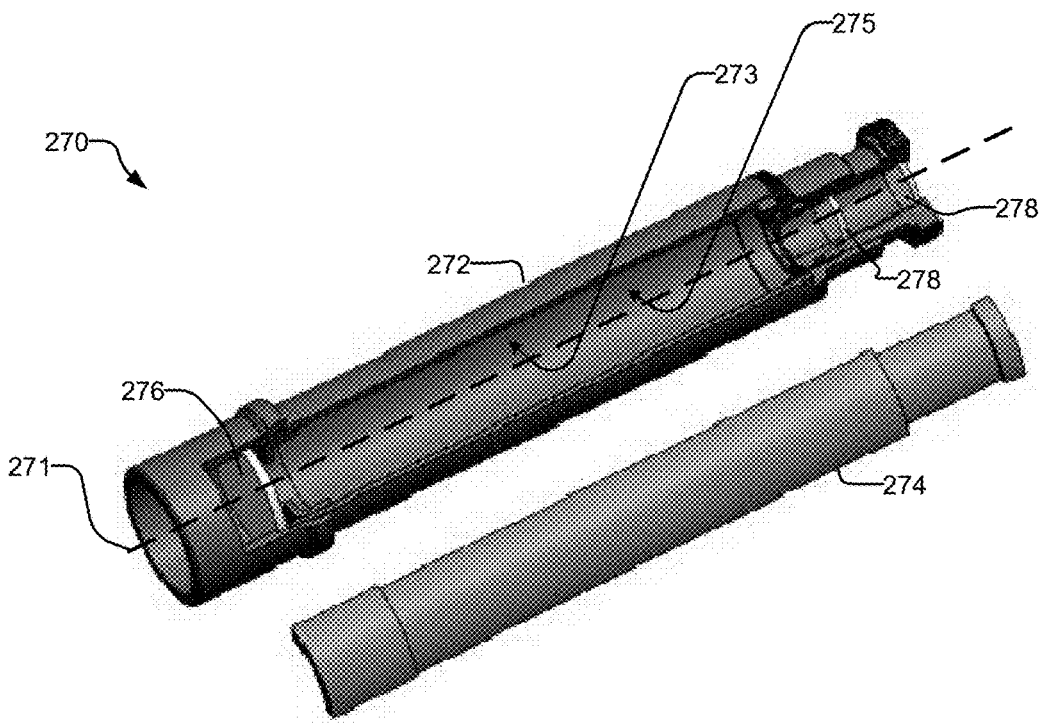
FIG. 11 shows a perspective view of the FIG. 8 finderscope in an open configuration.

Like optical instrument 100 and optical instrument 200 described herein, finderscope 270 comprises a finderscope hollow tube 271 which is convertible between a closed configuration (shown in FIG. 8) and an open configuration (shown in FIG. 9 and in more detail in FIG. 11) by suitable movement of finderscope cover portion 274 relative to finderscope openable housing 272 to cover or uncover finderscope housing aperture 275 defined by finderscope openable housing 272. More specifically, finderscope cover portion 274 may be moveable to an open position, where finderscope housing aperture 275 is uncovered and optical components 276, 278 held within (or partially within) finderscope optical path cavity 273 are viewable through finderscope housing aperture 275 and to a closed position, where finderscope housing aperture 275 is covered and optical components 276, 278 are not visible through finderscope optical path cavity. The movement of finderscope cover portion 274 relative to finderscope openable housing 272 may incorporate any of the movement types or mechanisms discussed herein in relation to the movement of cover portion 114 relative to openable housing 100. Optical components 276, 278 may be securely fixed to finderscope openable housing 272 to receive and direct light along finderscope optical path 271 (FIG. 11) that extends in a direction parallel to longitudinal direction 207 and main optical path 238A (FIGS. 8 and 9). The movement of finderscope cover portion 274 to its open position does not alter how light passes through finderscope 270, and thus a user is able to observe and understand the optical and mechanical structures within finderscope 270 when finderscope 270 is being used to locate remote objects. In other respects, the operation of finderscope 270, and in particular, the conversion of finderscope 270 between its open and closed configurations may be similar to that discussed herein in connection with optical instrument 100.

Referring back to FIGS. 8 and 9, eyepiece 280 of the illustrated embodiment is fixed to an exterior surface 208 of housing 210 and, as discussed above, is aligned with exit aperture of openable housing 210 to receive light reflected from secondary mirror 206 which is generally oriented along eyepiece optical axis 238B. Eyepiece 280 comprises optical component(s) 220 which are configured (e.g. shaped and/or located) to magnify the image of remote objects aligned with main optical axis 238A. Like optical instrument 100 and optical instrument 200 described herein, eyepiece 280 comprises an eyepiece hollow tube 281 which is convertible between a closed configuration (shown in FIG. 8) and an open configuration (shown in FIGS. 9 and 12) by suitable movement of eyepiece cover portion 284 relative to eyepiece openable housing 282 to cover or uncover eyepiece housing aperture 285 defined by eyepiece openable housing 282. More specifically, eyepiece cover portion 284 may be moveable to an open position where eyepiece housing aperture 285 is uncovered and optical component(s) 220 held within (or partially within) eyepiece optical path cavity 283 are viewable through eyepiece housing aperture 285 and to a closed position, where eyepiece housing aperture 285 is covered and optical component(s) 220 are not visible through eyepiece housing aperture 285. The movement of eyepiece cover portion 284 relative to eyepiece openable housing 282 may incorporate any of the movement types or mechanisms discussed herein in relation to the movement of cover portion 114 relative to openable housing 100. Optical component(s) 220 may be securely fixed to eyepiece openable housing 282 to receive and direct light along eyepiece optical path 238B.

As shown in FIG. 10, light enters into openable housing 210 and is reflected by primary mirror 202. The light reflected by primary mirror 202 then impinges on secondary mirror 204 and is reflected to a focal point 242 along eyepiece optical axis 238B, thereby creating an image of remote objects/scenes along main optical path 238A. Eyepiece lens(es) 220 magnifies the image of remote objects. The movement of eyepiece cover portion 284 to its open position does not alter how light passes through eyepiece 280, and thus a user is able to observe and understand the optical and mechanical structures within eyepiece 280 when eyepiece 280 is being used to view remote objects. In other respects, the conversion of eyepiece 280 between its open and closed configurations may be similar to that discussed herein in connection with optical instrument 100.

Figure 12:
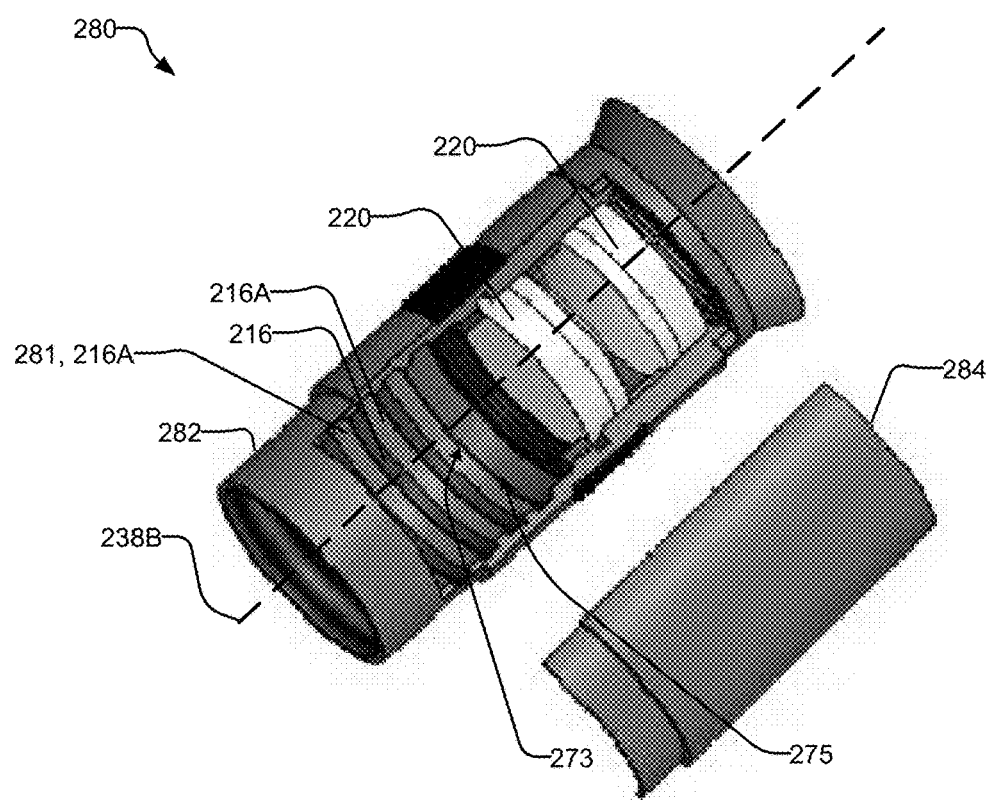
FIG. 12 shows a perspective view of the FIG. 8 eyepiece in an open configuration.

As shown best in FIGS. 9 and 12, optical instrument 200 permits optical experiments when eyepiece 280 is in the open configuration. Referring to FIG. 12, eyepiece 280 (in particular interior surface 281 of eyepiece openable housing 282) comprises transversely extending protrusions 216A which define corresponding transversely extending grooves 216. In the context of eyepiece 280, the transverse direction should be considered to be orthogonal to eyepiece optical axis 238B and the longitudinal direction should be considered to be along eyepiece optical axis 238B. One such transversely extending groove 216 (or a surface of one such protrusion 216A) may be longitudinally located within a transversely extending plane that intersects focal point 242. Other transversely extending grooves 216 may be located within transversely extending planes that are longitudinally spaced apart from, and on one or both longitudinal sides of, focal points 242. In some embodiments, transversely extending grooves 216 on one or both longitudinal sides of first focal point 242 are longitudinally spaced 0.5-5 mm apart. In some embodiments, this longitudinal spacing is 1-2 mm.

Like optical instrument 100 described herein, when eyepiece 280 is in the open configuration, a screen (not shown but similar to screens 150, 250 described herein) may be inserted through eyepiece housing aperture 285 and into one of transversely extending grooves 216 in a vicinity of focal point 242 (FIG. 12). The generally planar surface of the screen may show an image from an interior of eyepiece 282 (i.e. from within eyepiece optical path cavity 283) by reflecting light that passes partially through optical instrument 200 and eyepiece 280. In the illustrated embodiment, the screen can be inserted into one of grooves 216 in a vicinity of focal point 242 (e.g. at focal point 242 or on either or both longitudinal sides of first focal point 242) to display an image on the generally planar surface of the screen. Such an image may reflect light that interacts with optical components 204, 206, but not with eyepiece optical component(s) 220. The use of a screen to perform experiments or otherwise with eyepiece 280 may be similar to that described herein in relation to optical instrument 100 and its screens. In some embodiments, eyepiece 280 may be provided with slidable mechanisms for moving a screen (i.e. similar to those described herein in connection with FIGS. 6, 7A and 7B) or any other movement mechanism.

Figure 13:
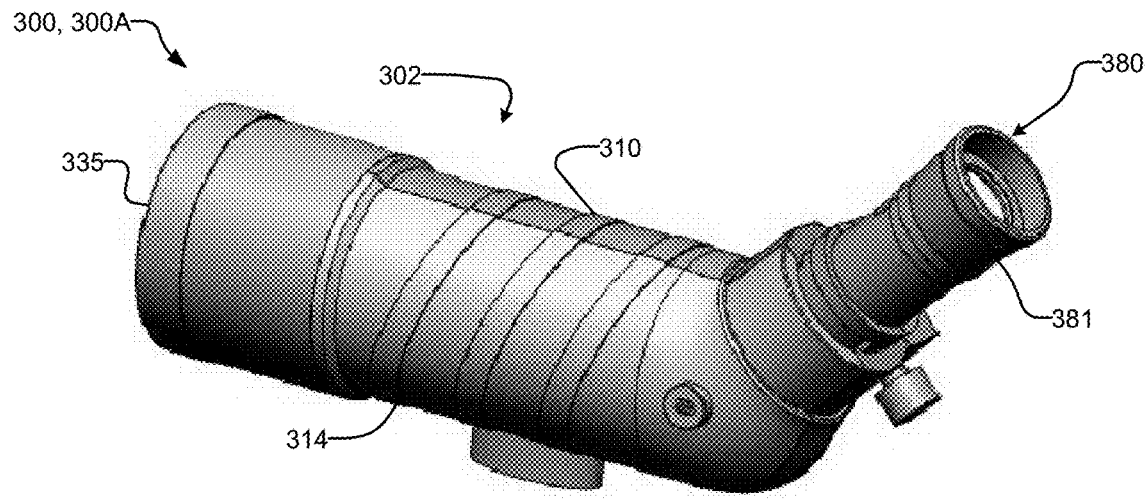
FIG. 13 shows a perspective view of a telescope having an eye piece according to another example embodiment in a closed configuration.
Figure 14:
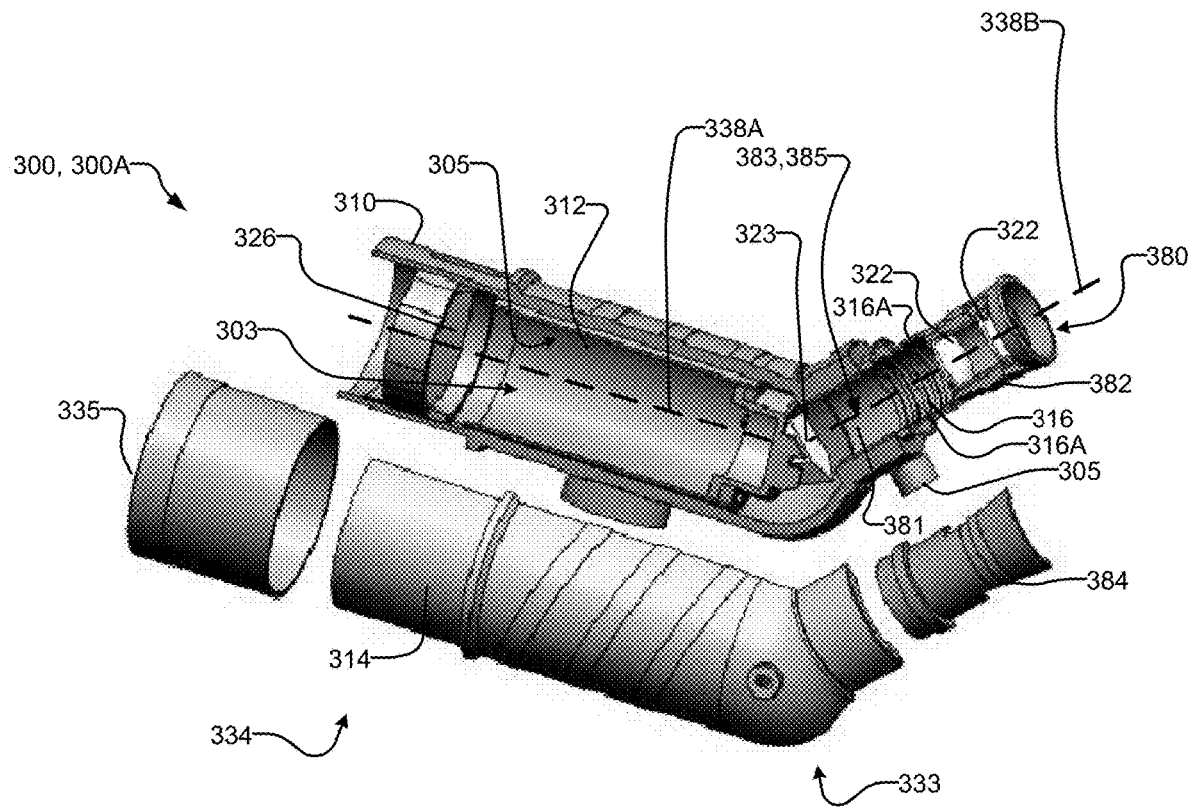
FIG. 14 shows a perspective view of the FIG. 13 telescope in an open configuration.

FIGS. 13 and 14 show an optical instrument 300 (in this case, a telescope 300A) according to another example embodiment. Elements of optical instrument 300 that correspond to elements of optical instrument 100 are illustrated with like reference numerals that have been incremented by 200.

Telescope 300 is similar in principle to telescope 100A described herein. However, instead of relay lens(es) 122, telescope 300 comprises a prism erector 323 to invert the image of remote objects. Additionally, telescope 300 comprises focus control 395.

Telescope 300 comprises a main hollow tube 302 which is generally elongated in a longitudinal direction (indicated by double-headed arrow 307) and which defines an optical path cavity 303 (i.e. a cavity through which light is transmitted in a direction generally aligned with main optical axis 338A) and optical components 326, 323 held fixedly therein. Main hollow tube 302 of the illustrated embodiment of FIGS. 13 and 14 has a generally hollow tubular shape with two ends, one being a curved end. One end is the objective lens end 334 and the curved end is the prism erector end 333. Objective end 334 is oriented towards the object/scene to be viewed or imaged. As can be seen from FIG. 15 in combination with FIG. 14, light is transmitted through objective lens 326 (which is located at or near objective end 334) and into optical path cavity 303, where the light continues to travel generally along main optical path 338A until it impinges on prism erector 323 at or near prism erector end 333. Prism erector 323 is configured (e.g. shaped and/or located) to direct light toward eyepiece 380 and eyepiece lens(es) 322 in a direction generally oriented along eyepiece optical axis 338B.

In the illustrated embodiment of FIGS. 13 and 14, main hollow tube 302 comprises an openable housing 310 and a cover portion 314 that is moveable relative to openable housing 310 to cover or expose housing aperture 305. In the illustrated embodiment of FIGS. 13 and 14, cover portion 314 is moveable to an open position, which exposes housing aperture 305. Cover portion 314 may be moved to its open position using any of the techniques and/or mechanisms discussed above in connection with cove portion 114. Once cover portion 314 is moved to its open position, optical path cavity 303 and optical components 326, 323 held therein are viewable through housing aperture 305. Openable housing 310 of the embodiment illustrated in FIGS. 13 and 14 comprises an interior surface 312 that defines a portion of optical path cavity 303. As shown in FIG. 14, openable housing 310 is configured to securely hold optical components 326, 323 therein and to enable optical components 326, 323 to receive and direct light along main, longitudinally extending, optical path 33A between optical components 323, 326 in optical path cavity 303.

As mentioned above, optical instrument 300 is convertible between an open configuration (shown in FIG. 140 and a closed configuration (shown in FIG. 13) by suitable movement of cover portion 314 relative to openable housing 310. In the illustrated embodiment of FIGS. 13 and 14, cover portion 314 is removably engaged with openable housing 310. In the open configuration, cover portion 314 is moved relative to openable housing 310 to visually expose optical components 323, 326 held within (or partially within) openable housing 310 via housing aperture 305. In particular in the case of the embodiment shown in FIGS. 13 and 14, cover portion 314 is removed from openable housing 310 to move cover portion 314 to its open configuration. The removal of cover portion 314 does not alter how light passes through telescope 300A and does not alter the locations of optical components 323, 326. Thus, when telescope 300A is in its open configuration, a user is able to observe and understand the optical and mechanical structures within telescope 300A when telescope 300A is being used to observe remote objects. In some embodiments, cover portion 314 and openable housing 310 may be connectable to one another using any of the techniques described herein for cover portion 114 and openable housing 110. FIG. 13 shows optical instrument 300 in the closed configuration. In the closed configuration, cover portion 314 covers housing aperture 305, so that it is not possible to see into optical path cavity 303. Cover portion 314 effectively visually conceals optical components 323, 326 held within openable housing 310.

Figure 15:
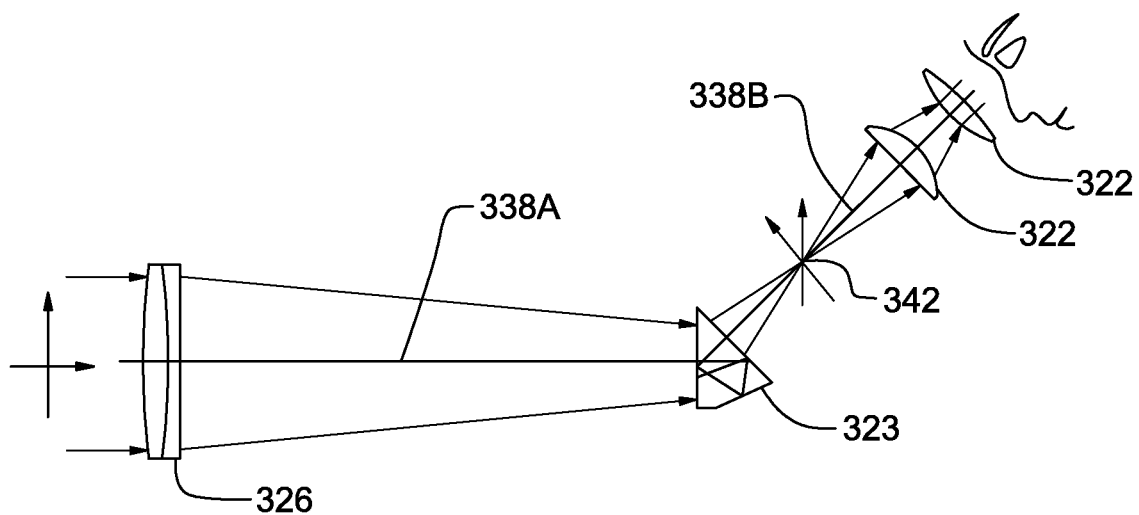
FIG. 15 schematically depicts the optical components of the FIG. 13 telescope and how light travels through these components.

Optical components 323, 326 are held securely within or partially within openable housing 310. Optical components 323, 326 are configured (e.g. shaped and/or located) to direct light received within openable housing 310 to eyepiece 380. FIG. 15 schematically depicts the travel of light through optical instrument 300 of the illustrated embodiment shown in FIGS. 13 and 14 and in particular through optical path cavity 303. In the illustrated example, optical component 326 comprises an objective lens and is positioned at or near objective lens end 334. Objective lens 326 is fixed to interior surface 312. Objective lens 326 collects light from an object/scene being viewed and directs such light generally in the direction of main optical axis 338A toward optical component 323. Optical component 323 comprises a prism erector that is located at or near prism erector end 333 and fixed to interior surface 312. Prism erect 323 is configured (e.g. shaped and/or positioned) to direct the light collected by objective lens 326 into eyepiece 380 (and eyepiece lens(es) 322) in a direction generally oriented along eyepiece optical axis 338B.

In the illustrated embodiment of FIGS. 13 and 14, objective lens end 334 of main hollow tube 302 is removably engageable with a shade hood 335. Shade hood 335 may have a tubular shape with a diameter just slightly larger than the diameter of objective lens end 334 of main hollow tube 302 to form a friction with objective lens end 334 of main hollow tube 302, although this is not necessary and shade hood 335 may be connectable to objective lens end 334 of main hollow tube 302 using any suitable technique. Shade hood 335 may be shaped to help block excessive light. To convert optical instrument 300 to the open configuration, shade hood 335 may be removed from main hollow tube 302 and then cover portion 314 may be moved relative to open housing 310 to visually expose optical components 326, 323 held therein.

Optical instrument 300 further comprises an eyepiece 380, secured to prism erector end 333 of main hollow tube 302 and operative to receive light from optical component 323 which is generally oriented along eyepiece optical axis 338B. Eyepiece 380 comprises eyepiece optical component(s) 320 may be configured (e.g. shaped and/or located) to magnify the image of remote objects aligned with main optical axis 238A. Like optical instruments 100, 200 described herein, eyepiece 380 comprises an eyepiece hollow tube 381 which is convertible between a closed configuration (shown in FIG. 13) and an open configuration (shown in FIG. 14) by suitable movement of eyepiece cover portion 384 relative to eyepiece openable housing 382 to cover or uncover eyepiece housing aperture 385 defined by eyepiece openable housing 382. More specifically, eyepiece cover portion 384 may be moveable to an open position where eyepiece housing aperture 385 is uncovered and optical component(s) 322 held within (or partially within) eyepiece optical path cavity 383 are viewable through eyepiece housing aperture 385 and to a closed position, where eyepiece housing aperture 385 is covered and optical component(s) 322 are not visible through eyepiece housing aperture 385. The movement of eyepiece cover portion 384 relative to eyepiece openable housing 382 may incorporate any of the movement types or mechanisms discussed herein in relation to the movement of cover portion 114 relative to openable housing 100. Eyepiece optical component(s) (lens(es)) 322 may be securely fixed to eyepiece openable housing 382 to receive and direct light along eyepiece optical path 238B.

Telescope 300 comprises an optional focus control 309 configured to adjust the focus of telescope 300. In the illustrated example, focus control 309 comprises a control knob and corresponding mechanism (not expressly shown). When the control knob of focus control 309 is rotated, the focus control mechanism adjusts the position of eyepiece openable housing 382, thereby adjusting the position of eyepiece lens(es) 322.

As shown in FIG. 15, light enters into openable housing 310 through objective lens 326 and is directed toward prism erector 323 and, after interacting with prism erector 323, is brought to a focal point 342 along eyepiece optical axis 338B, thereby creating an image of remote objects/scenes located along main optical path 338A. Eyepiece lens(es) 322 magnify the image of remote objects. The movement of eyepiece cover portion 384 to its open position does not alter how light passes through eyepiece 380, and thus a user is able to observe and understand the optical and mechanical structures within eyepiece 380 when eyepiece 380 is being used to view remote objects. In other respects, the conversion of eyepiece 380 between its open and closed configurations may be similar to that discussed herein in connection with optical instrument 100.

As shown best in FIGS. 14 and 15, optical instrument 300 permits optical experiments when eyepiece 380 is in the open configuration. Referring to FIG. 14, eyepiece 380 (in particular interior surface 381 of eyepiece openable housing 382) comprises transversely extending protrusions 316A which define corresponding transversely extending grooves 316. In the context of eyepiece 380, the transverse direction should be considered to be orthogonal to eyepiece optical axis 338B and the longitudinal direction should be considered to be along eyepiece optical axis 338B. One such transversely extending groove 316 (or a surface of one such protrusion 316A) may be longitudinally located within a transversely extending plane that intersects focal point 342 (FIG. 15). Other transversely extending grooves 316 may be located within transversely extending planes that are longitudinally spaced apart from, and on one or both longitudinal sides of, focal points 342. In some embodiments, transversely extending grooves 316 on one or both longitudinal sides of first focal point 342 are longitudinally spaced 0.5-5 mm apart. In some embodiments, this longitudinal spacing is 1-2 mm.

Like optical instrument 100 described herein, when eyepiece 380 is in the open configuration, a screen (not shown but similar to screens 150, 250 described herein) may be inserted through eyepiece housing aperture 385 and into one of transversely extending grooves 316 in a vicinity of focal point 342 (FIG. 15). The generally planar surface of the screen may show an image from an interior of eyepiece 382 (i.e. from within eyepiece optical path cavity 383) by reflecting light that passes partially through optical instrument 300 and eyepiece 380. In the illustrated embodiment, the screen can be inserted into one of grooves 316 in a vicinity of focal point 342 (e.g. at focal point 342 or on either or both longitudinal sides of first focal point 342) to display an image on the generally planar surface of the screen. Such an image may reflect light that interacts with optical components 326, 323, but not with eyepiece optical component(s) 322. The use of a screen to perform experiments or otherwise with eyepiece 380 may be similar to that described herein in relation to optical instrument 100 and its screens. In some embodiments, eyepiece 380 may be provided with slidable mechanisms for moving a screen (i.e. similar to those described herein in connection with FIGS. 6, 7A and 7B) or any other movement mechanism.

Figure 16:
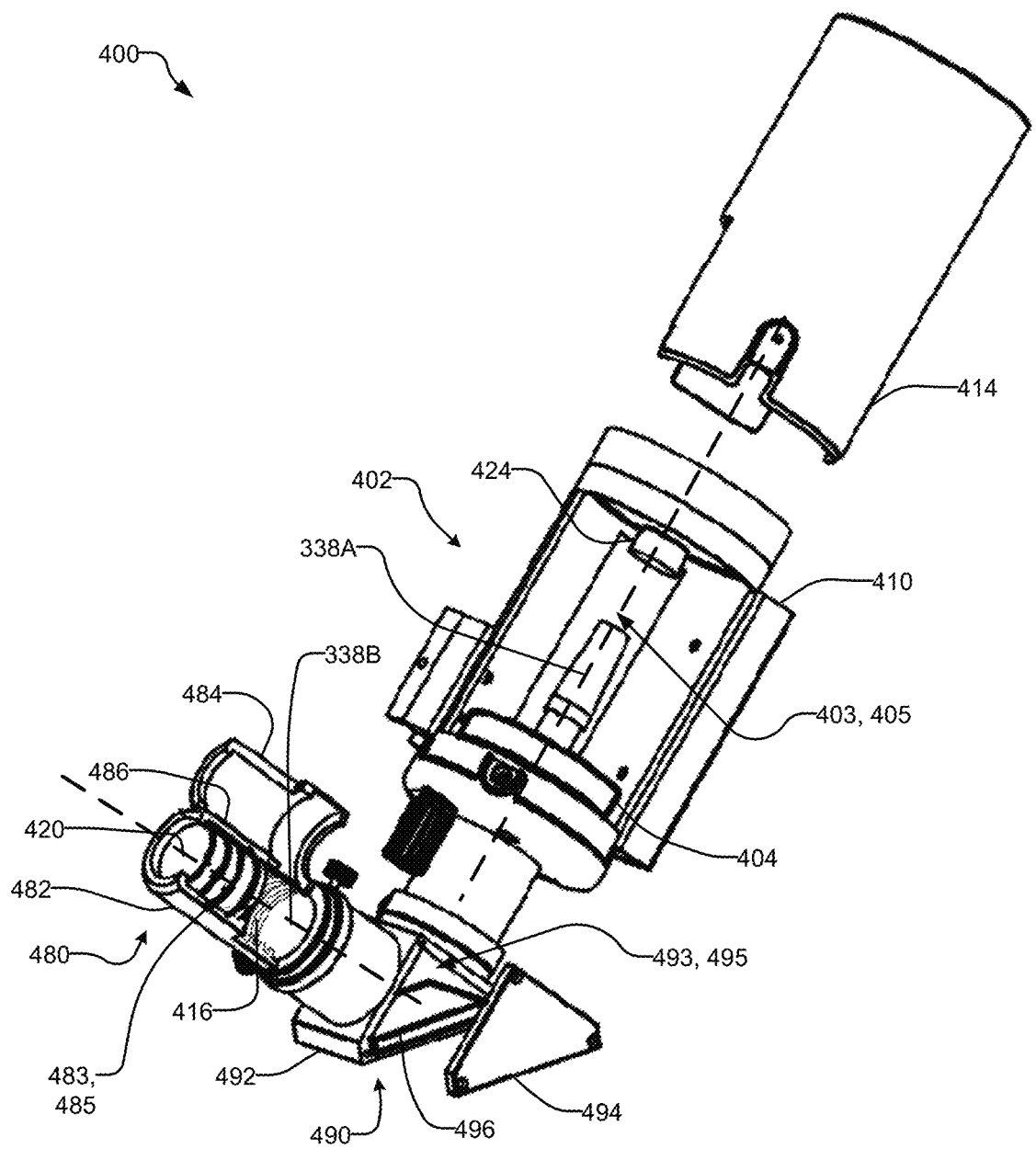
FIG. 16 shows a perspective view of a telescope having a mirror enclosure and an eyepiece according to an example embodiment, with the telescope, the mirror enclosure and the eyepiece in open configurations.
Figure 17:
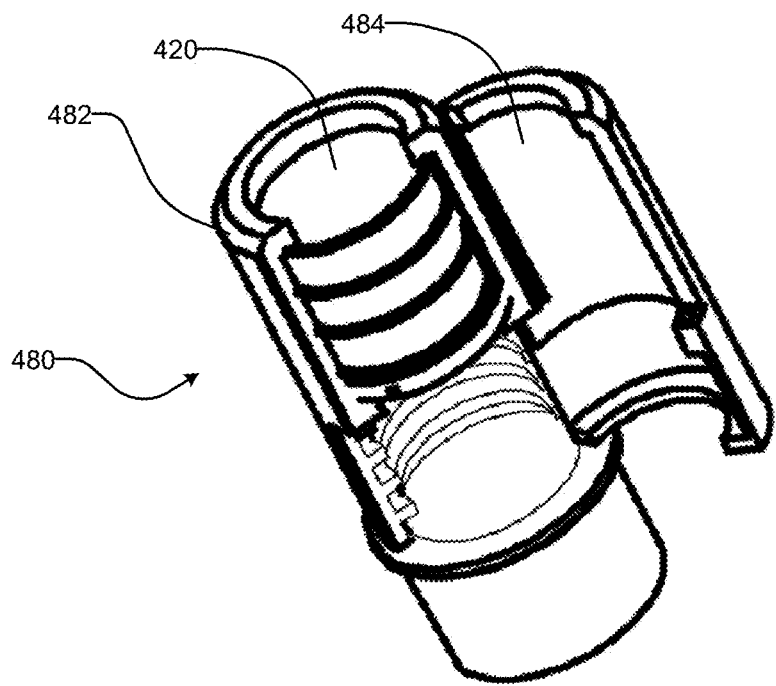
FIG. 17 shows a magnified perspective view of the eyepiece of the FIG. 16 telescope in an open configuration.
Figure 18:
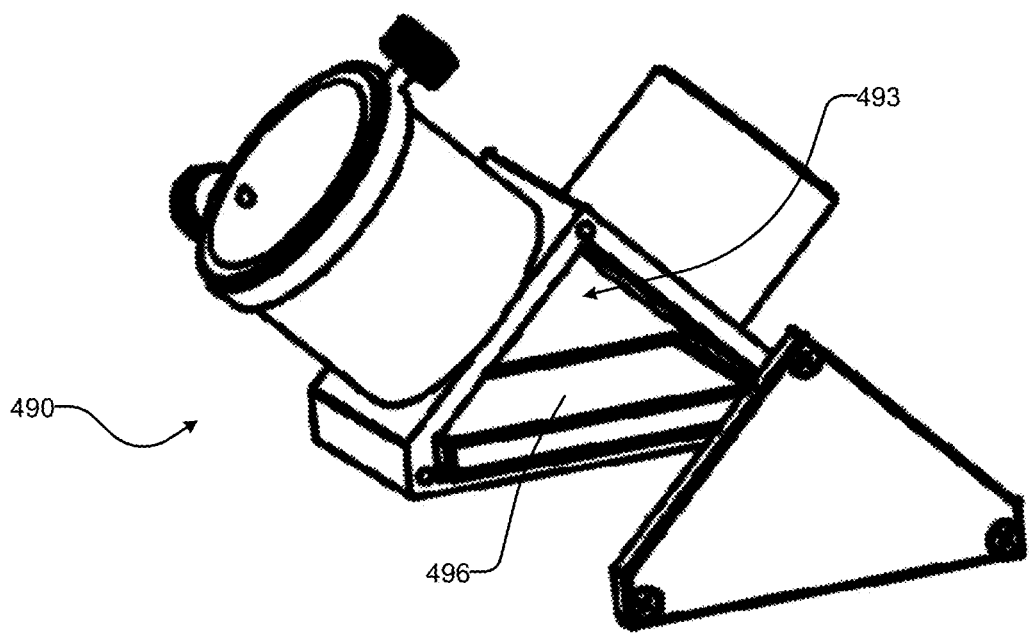
FIG. 18 shows a magnified perspective view of the mirror enclosure of the FIG. 16 telescope in an open configuration.

FIGS. 16-18 show an optical instrument 400 (in this case a telescope 400) according to another example embodiment. Elements of optical instrument 400 that correspond to elements of optical instrument 100 are illustrated with like reference numerals that have been incremented by 300. Elements of optical 300 that correspond to elements of optical instrument 100 are illustrated with like reference numerals that have been incremented by 200.

Telescope 400 is similar in principle to telescope 100A described herein. Telescope 400 comprises several optical components: a main hollow tube 402 in which an objective lens 424 and a primary mirror 404 are fixedly mounted; a diagonal 490 holding a diagonal mirror 496 therein; and an eyepiece 480 holding eyepiece lens(es) 420 therein.

Each of main hollow tube 402, diagonal 490 and eyepiece 480 is convertible between an open configuration and a closed configuration by suitable movement of respective cover portions 414, 494, 484 relative to respective openable housings 410, 492, 482 to uncover or cover corresponding housing apertures 405, 495, 485 and to thereby permit visual inspection (in the open configurations) of respective optical path cavities 403, 493, 483 via corresponding housing apertures 405, 495, 485 and the optical components 404, 424, 420, 496 housed therein.

Figure 19:
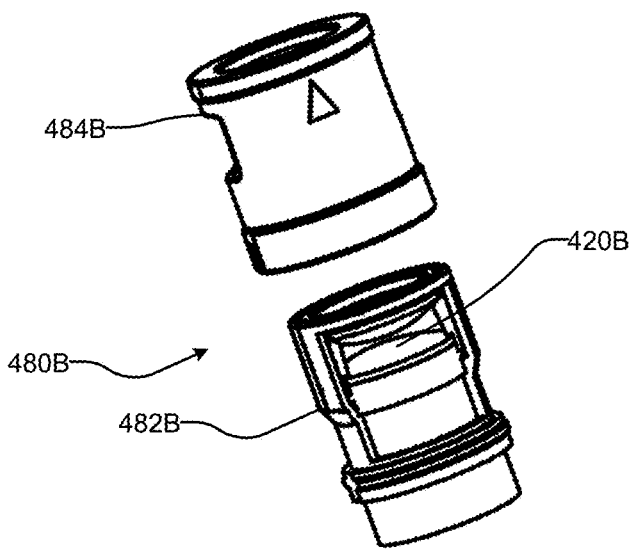
FIG. 19 shows a magnified perspective view of an eyepiece with a slidably removable cover which may be used with a telescope similar to the FIG. 16 telescope in some embodiments.
Figure 20:
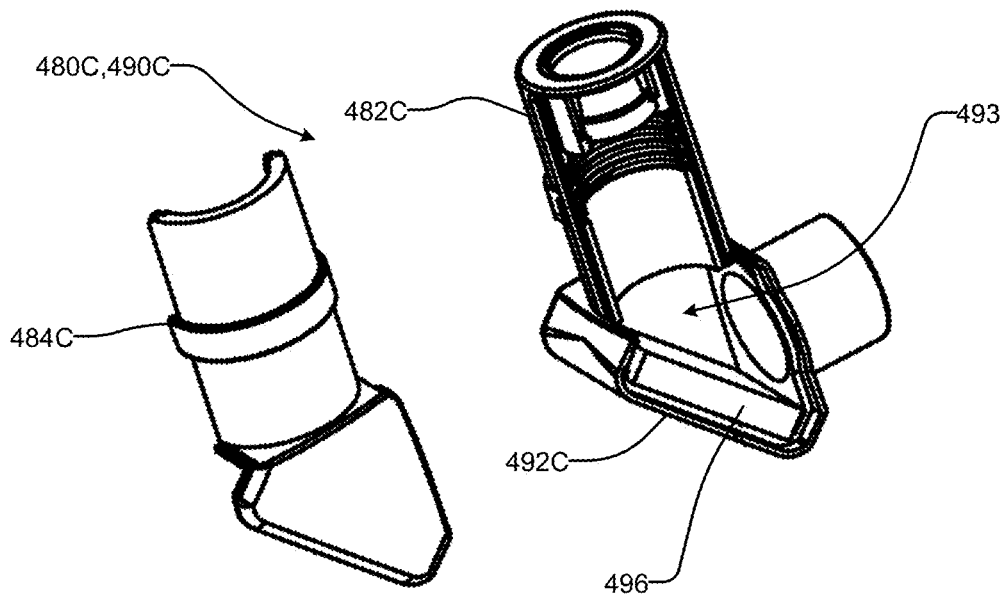
FIG. 20 shows a magnified perspective view of an eyepiece and diagonal component with a single removable cover.

In the illustrated embodiment, eyepiece cover portion 484 is hingedly coupled to eyepiece openable housing 482 along mutually aligned edges 486. To convert eyepiece 480 to the open configuration, eyepiece cover portion 484 is pivoted outwardly relative to eyepiece openable housing 482 to visually expose eyepiece lens(es) 420 held therein. This hinged relative movement is not necessary. FIG. 19 illustrates another example eyepiece 480B that could be additionally or alternatively used with telescope 400 (FIG. 16) in some embodiments. Eyepiece 480B differs from eyepiece 480 (FIGS. 16 and 17) in that eyepiece cover portion 484B of eyepiece 480B is slidably coupled to eyepiece openable housing 482B. To convert eyepiece 480B to the open configuration, eyepiece cover 484B is slid in a longitudinal direction away from eyepiece openable housing 482B to thereby remove eyepiece cover 484B from eyepiece openable housing 482B and to expose lens(es) 420B. FIG. 20 illustrates yet another example embodiment wherein a combination of eyepiece 480C and diagonal 490C are convertible between an open configuration and a closed configuration by movement of a single cover portion 484C relative to a combination eyepiece/diagonal openable housing 482C. The combination eyepiece 480C and diagonal 490C may be used with telescope 400 (FIG. 16) in addition or in the alternative to eyepiece 480 and diagonal 490. In the FIG. 20 embodiment, cover portion 484C may be completely removable from telescope 400 by moving it transversely away from openable housings 482C. In other embodiments, cover portions 414, 494, 484 may move relative to their corresponding openable housings 410, 492, 482 by any movement types or mechanisms, including any of the movement types or mechanisms described herein for the movement of cover portion 114 relative to openable housing 110.

Telescope 400 permits optical experiments when eyepiece 480 is in the open configuration using a screen (not shown). Eyepiece open housing 482 has transversely extending grooves 416 defined by corresponding transversely extending protrusions (not expressly enumerated) on the interior surface of eyepiece openable housing 482 for inserting a screen therein to show an image of remote objects. Transversely extending grooves 416 may be in a vicinity of (e.g. at or on one or both sides of) a focal point located on eyepiece optical axis 438B. The use of a screen with eyepiece 480 may be similar to that described above for eyepiece 280, eyepiece 380 and/or optical instrument 100. A slidable mechanism similar to that of optical instrument 100' may be provided in some embodiments.

Figure 21:
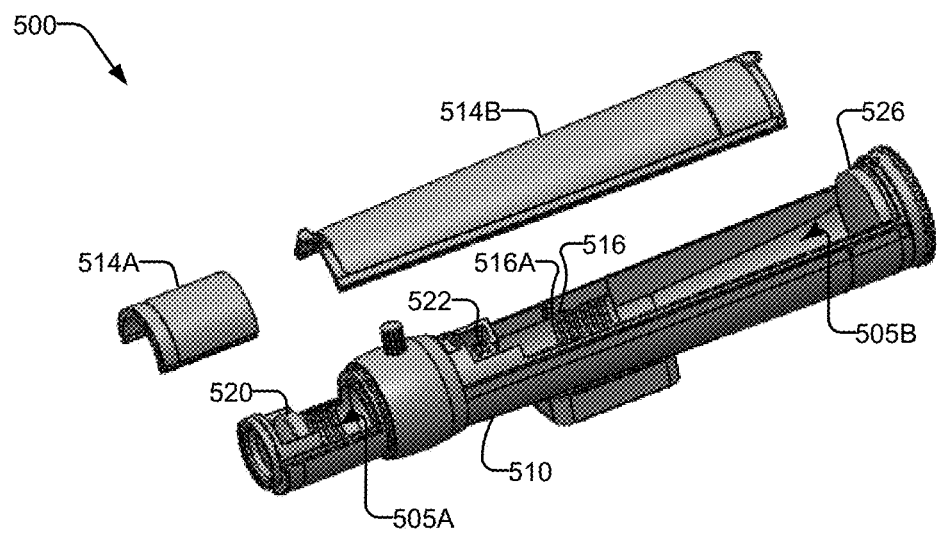
FIG. 21 shows a perspective view of a telescope according to an example embodiment in an open configuration.
Figure 22:
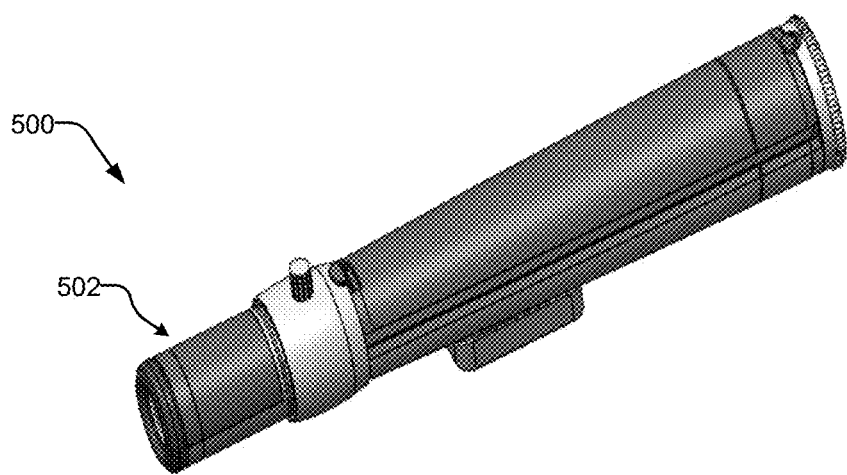
FIG. 22 shows a perspective view of the FIG. 21 telescope in a closed configuration.
Figure 23:
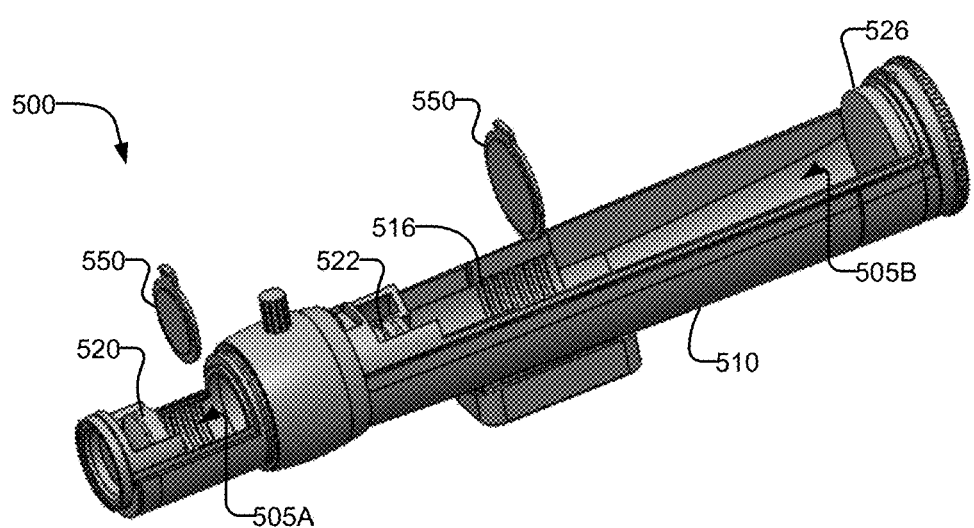
FIG. 23 shows a partial perspective view of the FIG. 21 telescope in an open configuration and a pair of screens being operationally receivable in the FIG. 21 telescope.

FIGS. 21-23 show another example embodiment of a telescope 500. Telescope 500 is similar to telescope 100A described herein. However, instead of one openable region, telescope 500 has two openable regions.

Figure 24:
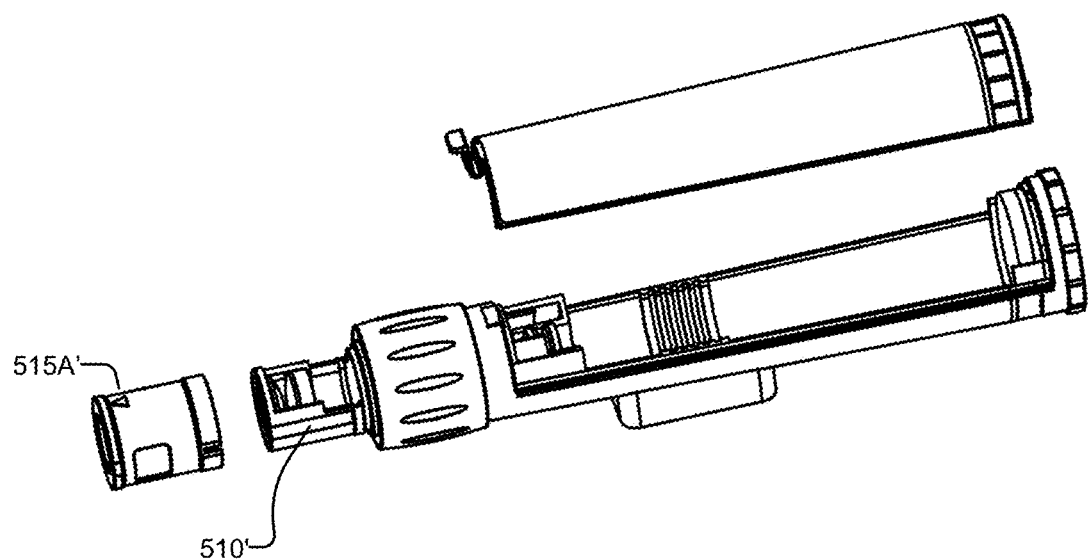
FIG. 24 shows a perspective view of a telescope according to another embodiment similar to that of the FIG. 21 telescope, except having a slidably removable cover.

Telescope 500 has optical components 520, 522, 526 fixedly held within a hollow tube 502. Hollow tube 502 comprises an openable housing 510 and two cover portions 514A, 514B that are moveable relative to openable housing 510. Each one of cover portions 514A, 514B is moveable to an open position, which exposes the respective housing aperture 505A, 505B. Once cover portion 514A is moved to the open position, optical component 520 held within openable housing 510 is viewable through housing aperture 505A. Similarly, once 514B moved to the open position, optical components 522, 526 held within openable housing 510 is viewable through housing aperture 505B. In the embodiment illustrated in FIG. 21, cover portions 514A and 514B are movable into the open position through disengaging a latch and removing cover portions 514A and 514B. In some embodiments, these cover portions are movable into the open position by other forms of movement. For example, FIG. 24 illustrates an example embodiment similar to telescope 500 of FIGS. 21-23, except that eyepiece cover portion 515A' of the FIG. 24 embodiment is removable from openable housing 510' by slidably removing eyepiece cover portion 515A' from openable housing 510'. In some embodiments, other forms of movement and/or movement mechanisms could be used (e.g. hinged connections and/or the like).

When cover portions 514A, 514B are in their closed position, they engage with openable housing 510 in any manner known in the art to cover their respective housing aperture 505A, 505B and visually conceal optical components 520, 522, 526.

Telescope 500 permits optical experiments when at least one of cover portions 514A, 514B is in its closed position. Interior surface 512 of openable housing 510 comprises a plurality of transversely extending and longitudinally spaced apart protrusions 516A that define grooves 516 between pairs of protrusions 516A. Grooves 516 are for inserting a screen 550 to show an image of remote objects. Transversely extending grooves 516 may be in a vicinity of (e.g. at or on one or both sides of) a focal point. A slidable mechanism similar to that of optical instrument 100' may be provided in telescope 500.

In various embodiments of optical instruments described herein, screens are described as being mountable to the openable housing within the optical path cavity so that an image of an object or scene viewed by the optical instrument is reproduced on the screen. These screens may be generally reflective, such that an image is shown on the screen in the direction of incident light entering the optical instrument (such as on screen 150 described above in FIG. 3). In some embodiments of the various optical instruments described herein, one or more screens may additionally or alternatively comprise a transmissive screen. A transmissive screen may be operative to have an image projected on the screen wherein the image is viewable from the opposite direction of incident light entering the optical instrument. The transmissive screen may achieve this effect using any appropriate means known in the art. For example, Kitano et al, U.S. Pat. No. 8,072,682B2 TRANSMISSIVE SCREEN AND DIFFUSION PLATE provides a transmissive screen comprising, sequentially, a projector, a Fresnel lens which condenses dispersed projected light, and a diffusion plate for diffusing the projected light such that an image is displayed. In another illustrative embodiment, the transmissive screen can comprise an image sensor connected to an LCD device displaying the image. In some embodiments, the screens described herein may be replaced by other optical components—e.g. lenses, so that the other optical may be moved in a manner similar to that described herein for screens.

Figure 25:
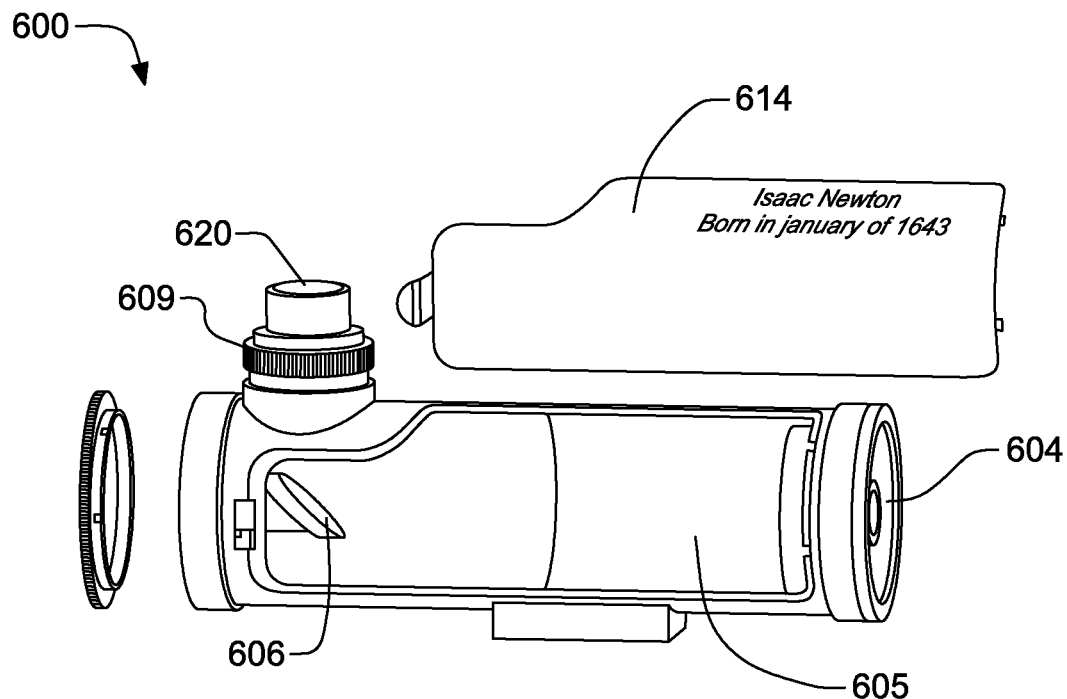
FIG. 25 shows a perspective view of a telescope according to an example embodiment in an open configuration.
Figure 26:
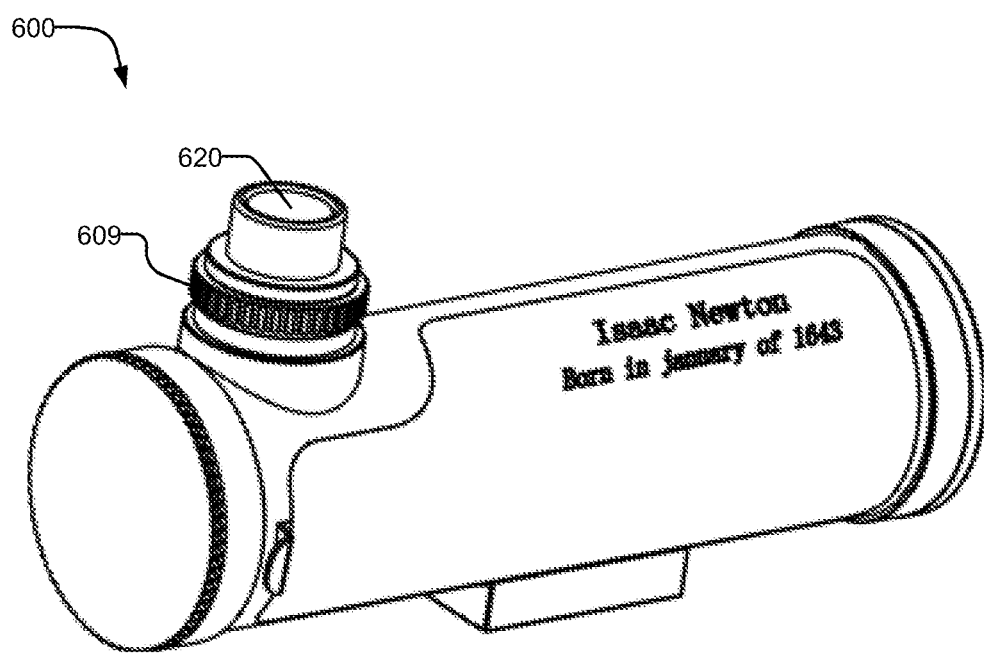
FIG. 26 shows a perspective view of the FIG. 25 telescope in a closed configuration.
Figure 27:
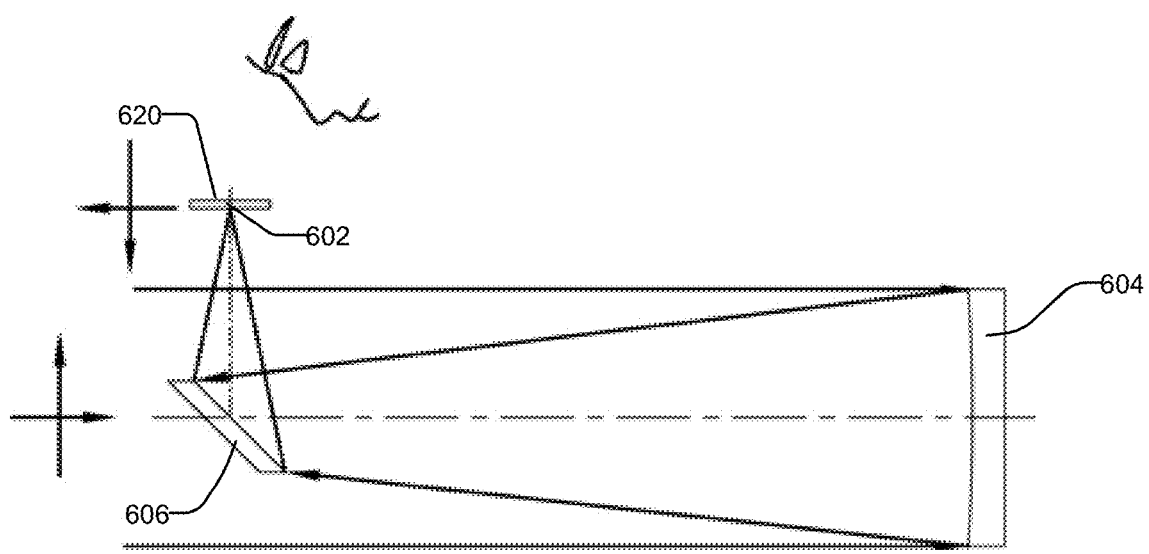
FIG. 27 schematically depicts the optical components of the FIG. 25 telescope and how light interacts with these optical components.

In some embodiments, optical components (e.g. one or more lenses or transmissive screens) of the eyepiece component may be moveable in the manner described herein for screens. FIGS. 25-27 show another example embodiment of a telescope 600. Telescope 600 is similar to telescope 200A described herein. However, telescope 600 comprises an optical element (e.g. a lens or a transmissive screen) 620 which may be moveable in the manner described herein for screens.

FIG. 27 schematically depicts the travel of light through telescope 600. In the illustrated example, telescope 600 comprises primary mirror 604 and a secondary mirror 606. In this example, moveable optical element 620 is located at the focal point 602. When the object to be viewed and/or imaged is infinitely far away from telescope 600, the image of the remote object is formed at focal point 602, which may be displayed or otherwise viewable through optical element 620 (in focus) when moveable optical element 620 is located at focal point 602. However, a user may experiment by moving optical element 620 away from focal point 602 to determine the impact that such movement has on the quality of the image viewable through optical element 620.

Telescope 600 of the illustrated embodiment comprises an optional focus control 609 which may be configured to adjust the focus of telescope 600 (e.g. the location of optical element 620). In the illustrated example of FIGS. 25 and 26, focus control 609 comprises a control knob and a focus control mechanism (not expressly shown). When the control knob of focus control 609 is rotated, the focus control mechanism adjusts the position of optical element 620. It may be desirable to adjust the position of optical element 620 away from focal point 602 when the object to be viewed and/or imaged is not infinitely far away from telescope 600 and the image plane does not lie on the plane of focal point 602.

In various embodiments described herein, optical components are described as being rigidly or securely mounted or held by openable housings. In some embodiments, some such optical components may be permitted to move relative to the openable housings to which they are mounted—e.g. to adjust their positions relative to their respective openable housings.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A telescope comprising:
   an openable housing and a cover portion which together define an optical path cavity through which light travels for operation of the telescope;
   a first optical component with a first focal point, the first optical component mounted to the openable housing and located within or at least partially within the optical path cavity;
   a second optical component mounted to the openable housing and located within or at least partially within the optical path cavity;

wherein the first focal point is between the first optical component and the second optical component;

wherein the openable housing defines a housing aperture; and wherein the cover portion is moveable relative to the openable housing between: a closed position where the cover portion is located to cover the housing aperture to visually conceal at least one of the first optical component, the second optical component, and the first focal point or at least portions of at least one of the first optical component, the second optical component, and the first focal point; and an open position where the cover portion is located to uncover the housing aperture and visually expose at least one of the first optical component, the second optical component, and the first focal point, or at least portions of at least one of the first optical component, the second optical component, and the first focal point, via the housing aperture.

2. The telescope according to claim 1 wherein the cover portion is hingedly coupled to the openable housing, so that the cover portion moves pivotally, relative to the openable housing, between the open and closed positions.

3. The telescope according to claim 1 wherein the cover portion is slidably coupled to the openable housing, so that the cover portion moves slidably, relative to the openable housing, between the open and closed positions.

4. The telescope according to claim 1 comprising a screen removably coupleable to the openable housing when the cover portion is in the open configuration at at least one longitudinal location within the optical path cavity.

5. The telescope according to claim 4 wherein the at least one longitudinal location corresponds to a longitudinal location of the first focal point.

6. The telescope according to claim 4 wherein the openable housing comprises a plurality of transverse protrusions that define transversely opening grooves between longitudinally adjacent pairs of protrusions and wherein the screen is removeably coupleable to the openable housing by partial insertion of the screen into one such transversely opening groove.

7. The telescope according to claim 6 comprising a plurality of grooves, at least one of which is located at the at least one longitudinal location within the optical path cavity and others of which are located on one or both longitudinal sides of the at least one longitudinal location.

8. The telescope according to claim 4 wherein the openable housing comprises a slidable mechanism comprising a screen-holder which is longitudinally slidable therein and wherein the screen is removeably coupleable to the openable housing by removable coupling of the screen to the screen-holder.

9. The telescope according to claim 8 wherein the slidable mechanism comprises:

a longitudinally extending slot defined along a length of the openable housing; and a screen guide comprising a first portion located within the slot and a second portion that extends out of the slot, the second portion shaped to hold the screen.

10. The telescope according to claim 9 wherein the first portion of the screen guide comprises a slide bearing for slidable longitudinal movement of the screen guide along the longitudinally extending slot.

11. The telescope according to claim 9 wherein the first portion of the screen guide comprises one or more rollers for rolling longitudinal movement of the screen guide along the longitudinally extending slot.

12. The telescope according to claim 9 wherein the second portion of the screen guide comprises a pair of prongs for holding the screen there between.

13. The telescope according to claim 1 wherein the first optical component and the second optical component each comprise at least one of: a lens, a mirror and a prism.

14. The telescope according to claim 1 further comprising an annular or semi-annular tube ring located to at least partially surround one of the first optical component and the second optical component and to abut against a surface of the openable housing, the tube ring dimensioned to provide a tight fit between the one of the first optical component and the second optical component and an interior surface of the openable housing.

15. The telescope according to claim 1 further comprising a focus control configured to adjust the position of at least one of the first optical component and the second optical component.

16. The telescope according to claim 1 further comprising a shade hood engageable with the openable housing, the shade hood shaped to prevent at least some off-axis light from entering into the openable housing.

17. The telescope according to claim 4 wherein the screen is reflective.

18. The telescope according to claim 4 wherein the screen is at least partially transmissive.

19. A method for observing an object with a telescope, the method comprising:

adjusting the telescope to focus on the object; and moving a cover portion of the telescope relative to an openable housing of the telescope:

from a closed position where the cover portion is located to cover a housing aperture defined by the openable housing and to thereby conceal or at least partially conceal at least one of a first optical component with a first focal point and a second optical component, the first optical component and second optical component located within or at least partially within a longitudinally extending optical path cavity defined by the cover portion and the openable housing; and to an open position where the cover portion is located to uncover the housing aperture and visually expose at least one of the first optical component, the second optical component, and the first focal point, or at least portions of at least one of the first optical component, the second optical component, and the first focal point via the housing aperture;

wherein the first focal point is between the first optical component and the second optical component.

20. The method according to claim 19 the method further comprising inserting a screen into the optical path cavity through the housing aperture and locating the screen so that an image from the telescope is projected on to the screen.

21. The method according to claim 20 comprising moving the screen longitudinally within the optical path cavity.

22. The method according to claim 21 wherein moving the screen longitudinally within the optical path cavity comprises locating the screen at a longitudinal location of the first focal point.

23. The method according to claim 20 comprising removing the screen from the optical path cavity and moving the cover portion from the open position to the closed position.

24. The method according to claim 20 wherein the screen is reflective.

25. The method according to claim 20 wherein the screen is at least partially transmissive.

26. A telescope comprising:

an openable housing defining a first and second housing apertures;

a first cover portion engageable with the openable housing to visually conceal the first housing aperture;

a second cover portion engageable with the openable housing to visually conceal the second housing aperture;

wherein the first and second cover portions and the openable housing together define an optical path cavity through which light travels for operation of the telescope;

a first optical component with a first focal point, the first optical component mounted to the openable housing and located within or at least partially within the optical path cavity;

a second optical component mounted to the openable cover portion and located within or at least partially within the optical path cavity;

wherein the first focal point is between the first optical component and the second optical component;

wherein the first and second cover portions are moveable relative to the openable housing between: a closed position where the first and second cover portions are located to cover the respective housing apertures and visually conceal at least one of the first optical component, the second optical component, and the first focal point, or at least portions of at least one of the first optical component, the second optical component, and the first focal point; and an open position where the first and second cover portions are located to uncover the respective housing apertures and visually expose at least one of the first optical component, the second optical component, and the first focal point, or at least portions of at least one of the first optical component, the second optical component, and the first focal point, via the first and second housing apertures.

27. A telescope comprising:

an openable housing defining a first and second housing apertures;

a cover portion engageable with the openable housing to visually conceal the first housing aperture, the cover portion and openable housing together defining an optical path cavity through which light travels for operation of the telescope;

a first optical component with a first focal point, the first optical component mounted to the openable housing and located within or at least partially within the optical path cavity;

a second optical component mounted to the openable cover portion and located within or at least partially within the optical path cavity;

wherein the first focal point is between the first optical component and the second optical component;

wherein the cover portion is moveable relative to the openable housing between a closed position where the cover portion is located to cover the first housing aperture to visually conceal at least one of the first optical component, the second optical component, and the first focal point, or at least portions of at least one of the first optical component, the second optical component, and the first focal point; and an open position where the cover portion is located to uncover the first housing aperture and visually expose at least one of the first optical component, the second optical component, and the first focal point or at least portions of at least one of the first optical component, the second optical component, and the first focal point via the first housing aperture; and wherein one of the first optical component and second optical component comprises at least one of a lens and a transmissive screen, the at least one of the lens and the transmissive screen mounted to the second housing aperture.

28. The telescope according to claim 27 further comprising a focus control, the focus control operative to move the at least one of the lens and the transmissive screen along the optical path cavity relative to the openable housing.

* * * * *